(12) United States Patent
Kashimoto

(10) Patent No.: US 8,810,588 B2
(45) Date of Patent: Aug. 19, 2014

(54) DISPLAY SWITCHING APPARATUS

(75) Inventor: Kazutoshi Kashimoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 323 days.

(21) Appl. No.: 13/320,844

(22) PCT Filed: Mar. 22, 2011

(86) PCT No.: PCT/JP2011/001672
§ 371 (c)(1),
(2), (4) Date: Nov. 16, 2011

(87) PCT Pub. No.: WO2011/118199
PCT Pub. Date: Sep. 29, 2011

(65) Prior Publication Data
US 2012/0062573 A1  Mar. 15, 2012

(30) Foreign Application Priority Data
Mar. 24, 2010 (JP) ................ 2010-067589

(51) Int. Cl.
*G06F 13/00* (2006.01)
*G06T 1/60* (2006.01)
*G09G 5/399* (2006.01)
*G09G 5/393* (2006.01)

(52) U.S. Cl.
CPC .............. *G06T 1/60* (2013.01); *G03G 2360/08* (2013.01); *G09G 5/399* (2013.01); *G09G 5/393* (2013.01)
USPC ......................................... 345/536; 345/543

(58) Field of Classification Search
None
See application file for complete search history.

(56) References Cited

U.S. PATENT DOCUMENTS

| | | | | |
|---|---|---|---|---|
| 5,841,439 A | * | 11/1998 | Pose et al. | 345/418 |
| 8,269,782 B2 | * | 9/2012 | Washizu et al. | 345/505 |
| 2008/0040718 A1 | * | 2/2008 | Cloonan et al. | 718/102 |
| 2011/0072436 A1 | * | 3/2011 | Gilat et al. | 718/104 |

FOREIGN PATENT DOCUMENTS

| | | |
|---|---|---|
| JP | 10-210484 | 8/1998 |
| JP | 2000-206953 | 7/2000 |
| JP | 2002-10262 | 1/2002 |
| JP | 2005-275028 | 10/2005 |
| WO | 2009/038902 | 3/2009 |

OTHER PUBLICATIONS

International Search Report issued Jun. 28, 2011 in corresponding International Application No. PCT/JP2011/001672.

* cited by examiner

*Primary Examiner* — Kee M Tung
*Assistant Examiner* — William Beutel
(74) *Attorney, Agent, or Firm* — Wenderoth, Lind & Ponack, L.L.P.

(57) ABSTRACT

Provided is a display switching apparatus that reduces delayed display, and the like, of frame images. An information processing terminal 1 is provided with a first rendering component 61 that, in each first time interval, generates and writes an image to a buffer, a second rendering component 62 that, in each second time interval, generates and writes an image to a buffer, a frame buffer management unit 11 that allocates a high-speed frame buffer 31 on a high-speed memory device 18 and a universal frame buffer 32 on a universal memory device 19, and a display switching apparatus 12 that includes a switching determination unit 81 that repeatedly calculates a rendering load for each rendering component and a switching performance unit 82 that switches the buffers allocated to the rendering components when the high-speed frame buffer 31 is not allocated to the rendering component with the higher rendering load.

7 Claims, 11 Drawing Sheets

FIG. 9A
Fourth switching procedure

| Frame number m, n | 1 | 2 | 3 | 4 |
|---|---|---|---|---|
| First rendering component | 1 (511) | 2 (513) | 3 (515) | 5 |
| Second rendering component | 0 (512) | 2 (514) | 3 (516) | 4 |

FIG. 9B
First switching procedure

| Frame number m, n | 1 | 2 | 3 | 4 | Delay |
|---|---|---|---|---|---|
| First rendering component | – | 2 | 3 | 4 | -1 (521) |
| Second rendering component | 0 | 1 | 2 | 3 | -3 (522) |

FIG. 9C
Second switching procedure

| Frame number m, n | 1 | 2 | 3 | 4 | Delay |
|---|---|---|---|---|---|
| First rendering component | 1 | 2 | 3 | 4 | -1 |
| Second rendering component | 0 | 2 | 3 | 4 | 0 |

FIG. 9D
Third switching procedure

| Frame number m, n | 1 | 2 | 3 | 4 | Delay |
|---|---|---|---|---|---|
| First rendering component | 1 | 3 | 4 | 6 | 3 |
| Second rendering component | 0 | 2 | 3 | 4 | 0 |

FIG. 9E

| Total delay | Dropped frames | Load | Score |
|---|---|---|---|
| -4 | 1 | 0 | -3 |

FIG. 9F

| Total delay | Dropped frames | Load | Score |
|---|---|---|---|
| -1 | 0 | 0.1 | -0.9 |

FIG. 9G

| Total delay | Dropped frames | Load | Score |
|---|---|---|---|
| 3 | 1 | 0.1 | 4.1 |

DISPLAY SWITCHING APPARATUS

TECHNICAL FIELD

The present invention relates to display switching apparatuses in information processing terminals that display a plurality of superimposed images, and in particular to controlling switching between a plurality of buffers storing images.

BACKGROUND ART

In recent years, it is increasingly common for information processing terminals to show a plurality of superimposed images on a display. Such information processing terminals include car navigation systems, cellular telephones, and the like. For example, a car navigation system might display a map, along with a photographic image taken at a certain spot on the map superimposed thereon. Since image processing is continually becoming more complicated, in addition to a universal buffer, information processing terminals are provided with a more expensive high-speed buffer capable of faster processing than a universal buffer. The high-speed buffer is assigned to certain processes in order to shorten processing time for rendering. In the example of a car navigation system, the high-speed buffer is assigned to the component generating the map image that is displayed full-screen. On the other hand, the universal buffer is assigned to other components such as those generating photographic images. In this context, "components" correspond to units of applications divided up by function, process, or the like. As the processing time for rendering lengthens, problems such as dropped frames or delayed display of images occur. This worsens the quality of image display.

CITATION LIST

Patent Literature

Patent Literature 1: Japanese Patent Application Publication No. 2000-206953

SUMMARY OF INVENTION

Technical Problem

Rendering that is required of information processing terminals is becoming increasingly more complex. For example, in the above-described display of photographic images in a car navigation system, instead of simply displaying a photographic image taken at a certain spot on the map, a photograph at a certain spot may be rendered in 3D and enlarged. In this case, the processing time for rendering for the photographic image, which has a small display area as compared to the map, temporarily exceeds the processing time for rendering of the map.

When rendering becomes complicated as described above, the processing time for rendering lengthens. This makes problems such as dropped frames or delayed display of images salient.

In light of the above problems, it is an object of the present invention to provide a display switching apparatus that shortens the processing time for rendering over conventional technology, reducing the occurrence of dropped frames or delayed display of images due to lengthened processing time for rendering.

Solution to Problem

In order to solve the above problems, an aspect of the present invention is a display switching apparatus for switching a buffer allocated to each of a plurality of rendering components between a high-speed buffer and a universal buffer that are used for rendering images, the display switching apparatus comprising: a switching determination unit operable to repeatedly calculate a rendering load for each of the plurality of rendering components; and a switching performance unit operable to determine, each time the rendering load is calculated, whether the high-speed buffer is allocated to a highest-load rendering component, the highest-load rendering component having a highest calculated rendering load among the plurality of rendering components, and when determining negatively, to switch the buffer allocated to the highest-load rendering component and the high-speed buffer allocated to one of the plurality of rendering components.

Advantageous Effects of Invention

With the above structure, the total processing time for rendering by the first and the second rendering component is shortened after switching buffers. Therefore, the display switching apparatus that is an aspect of the present invention reduces skipped frames, delayed display of frame images, and the like as compared to a conventional structure.

BRIEF DESCRIPTION OF DRAWINGS

FIGS. 9A-9G show examples of scores calculated in Embodiment 2 of the present invention.

DESCRIPTION OF EMBODIMENT

Figure 1:
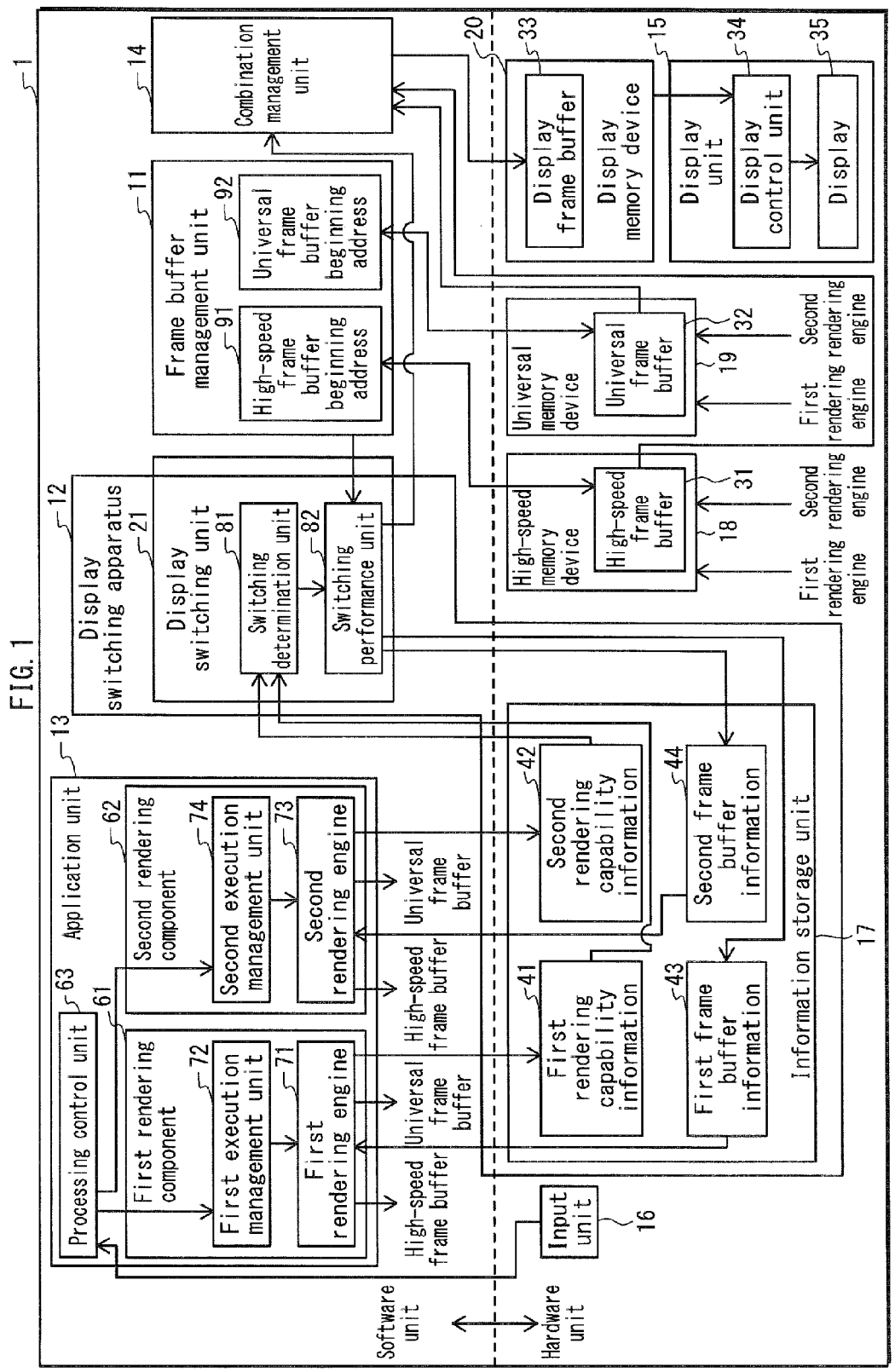
FIG. 1 is a block diagram showing an example of the structure of an information processing terminal provided with the display switching apparatus according to Embodiment 1 of the present invention.

The display switching apparatus according to one aspect of the invention is for switching a buffer allocated to each of a plurality of rendering components between a high-speed buffer and a universal buffer that are used for rendering images, the display switching apparatus comprising: a switching determination unit operable to repeatedly calculate a rendering load for each of the plurality of rendering components; and a switching performance unit operable to determine, each time the rendering load is calculated, whether the high-speed buffer is allocated to a highest-load rendering component, the highest-load rendering component having a highest calculated rendering load among the plurality of rendering components, and when determining negatively, to switch the buffer allocated to the highest-load rendering component and the high-speed buffer allocated to one of the plurality of rendering components.

The rendering load for each rendering component may be a time spent performing rendering per unit time, and the switching performance unit may select, as the highest-load rendering component, a rendering component with a longest time spent performing rendering per unit time.

With this structure, the rendering load is determined by the processing time for rendering. This is a relatively simple measurement as compared to measuring the load.

The switching performance unit may select one of a first, a second, and a third switching procedure, the first switching procedure being to switch the universal buffer and the high-speed buffer without copying content stored in either buffer, the second switching procedure being to switch the universal buffer and the high-speed buffer after copying content stored in the high-speed buffer into the universal buffer, and the third switching procedure being to switch the universal buffer and the high-speed buffer after copying content stored in the universal buffer into the high-speed buffer.

With this structure, the procedure for switching the buffer is selected from among a plurality of procedures. By selecting the most appropriate procedure, skipped processing is reduced to a minimum during rendering after buffer switching.

The switching performance unit may select one of the switching procedures by calculating a buffer switching cost for each of the switching procedures, the buffer switching cost being a comparison of rendering to be performed after switching buffers and rendering performed without switching buffers, and select a switching procedure having a smallest buffer switching cost.

With this structure, skipped processing is reduced to a minimum during rendering after buffer switching.

The buffer switching cost may be determined from at least one of a count of dropped frames, a display delay, and a CPU load.

With this structure, at least one of the number of dropped frames, the display delay, and the CPU load is reduced as compared to a conventional structure.

The buffer switching cost may be determined from at least two of a count of dropped frames, a display delay, and a CPU load.

With this structure, the amount of skipped processing after buffer switching is determined based only on a value that includes two or more or the number of dropped frames, the display delay, and the CPU load.

When skipped processing is determined to occur during display of frame images on a screen, the switching performance unit may lock the screen while the skipped processing is occurring.

With this structure, disruption of display on the screen is prevented.

The display switching method according to another aspect of the present invention is used in a display switching apparatus for switching a buffer allocated to each of a plurality of rendering components between a high-speed buffer and a universal buffer that are used for rendering images, the display switching method comprising the steps of: repeatedly calculating a rendering load for each of the plurality of rendering components; and determining, each time the rendering load is calculated, whether the high-speed buffer is allocated to a highest-load rendering component, the highest-load rendering component having a highest calculated load among the plurality of rendering components, and when determining negatively, switching the buffer allocated to the highest-load rendering component and the high-speed buffer allocated to one of the plurality of rendering components.

The integrated circuit according to another aspect of the present invention is for switching a buffer allocated to each of a plurality of rendering components between a high-speed buffer and a universal buffer that are used for rendering images, the integrated circuit comprising: a switching determination unit operable to repeatedly calculate a rendering load for each of the plurality of rendering components; and a switching performance unit operable to determine, each time the rendering load is calculated, whether the high-speed buffer is allocated to a highest-load rendering component, the highest-load rendering component having a highest calculated rendering load among the plurality of rendering components, and when determining negatively, to switch the buffer allocated to the highest-load rendering component and the high-speed buffer allocated to one of the plurality of rendering components.

With the above structure, the total processing time for rendering by the first and the second rendering component is shortened after switching buffers. Therefore, skipped frames, delayed display of frame images, and the like are reduced as compared to a conventional structure.

The following describes embodiments of the present invention with reference to the drawings.

1. Embodiment 1

An information processing terminal 1 provided with a display switching apparatus according to an embodiment of the present invention is a portable information processing terminal provided with a touchscreen display. By way of example, the information processing terminal 1 executes a navigation application that displays the current position of the information processing terminal 1 on a map. This application includes a component that is responsible for the function of displaying the map (hereinafter referred to as a "first rendering component") and a component that is responsible for the function of displaying a photograph (hereinafter referred to as a "second rendering component"). The map is displayed with images generated by other rendering components superimposed thereon as necessary, such as a photograph of actual scenery at a certain spot on the map.

Normally, each time the user holding the information processing terminal 1 moves, the current position of the information processing terminal 1 changes. Therefore, the displayed map is continually updated. In this case, the processing load for the first rendering component to display the map is larger than the processing load for the second rendering component to display the photograph. The information processing terminal 1 is provided with two types of memory devices: a high-speed memory device capable of high-speed data processing, and a universal memory device. The high-speed memory device is assigned to the first rendering component.

However, the user may perform operations such as zooming in or out on the photograph displayed on the map or displaying a section of the photograph. The processing load for the second rendering component exceeds the processing load for the first rendering component during such operations.

In this case, the display switching apparatus in the information processing terminal 1 switches the memory device used by the first rendering component with the memory device used by the second rendering component. As a result, the rendering component with the higher processing load uses the high-speed memory device.

The following describes a structure and procedures for appropriately switching the memory device (buffer) that each rendering component uses.

1.1 Structure

The information processing terminal 1 according to an embodiment of the present invention is, specifically, a computer system formed by a Central Processing Unit (CPU), Read Only Memory (ROM), Random Access Memory (RAM), touchscreen display unit, keyboard, and the like. Computer programs are stored on the ROM. The information processing terminal 1 achieves its functions by the CPU operating in accordance with the computer programs after reading the computer programs into the RAM.

FIG. 1 is a block diagram schematically showing the structure of the information processing terminal 1.

In FIG. 1, the information processing terminal 1 is shown with a separate software section and hardware section that correspond to the above computer programs. The software section includes a frame buffer management unit 11, a display switching unit 21, an application unit 13, and a combination management unit 14. The hardware section includes a display unit 15, an input unit 16, an information storage unit 17, a high-speed memory device 18, a universal memory device 19, and a display memory device 113. The display switching unit 21 and the information storage unit 17 form the display switching apparatus 12. The following describes each structure in detail.

(1) Hardware Section

The high-speed memory device 18 and the universal memory device 19 are memory devices storing image data. Input and output of data is faster for the high-speed memory device 18 than for the universal memory device 19. A high-speed frame buffer 31 is allocated in the high-speed memory device 18. The high-speed frame buffer 31 is for high-speed rendering. A universal frame buffer 32 is allocated in the universal memory device 19. The universal frame buffer 32 is for normal rendering. When rendering using the universal frame buffer 32, the load on the CPU and the like is higher than when performing the same processing using the high-speed frame buffer 31.

The display memory device 20 is an image memory. A display buffer 33 is allocated in the display memory device 20. The display buffer 33 stores images that are the basis of video shown on the display.

The display unit 15 includes a display control unit 34 and a display 35.

The display 35 is a device that displays images. Specifically, the display 35 is a liquid crystal display.

The display control unit 34 reads images at predetermined, periodic refresh times and displays the images on the display 35. The images are represented as image data stored in the display buffer 33.

In response to an information acquisition request, the display control unit 34 provides display information 46. The display information 46 includes a refresh interval, indicating the interval between each refresh time, as well as information indicating the latest refresh time at which the display is refreshed.

The input unit 16 is provided with a keyboard and a touchscreen. The input unit 16 detects a user operation on the keyboard or touchscreen. The input unit 16 then notifies the application unit 13 of key input information or touchscreen operation information indicating the input user operation (hereinafter, "key input information" and "touchscreen operation information" are collectively referred to as "user operation information").

The information storage unit 17 is a secure memory device storing information. The information storage unit 17 stores first rendering capability information 41, second rendering capability information 42, first frame buffer information 43, second frame buffer information 44, and the like.

The first frame buffer information 43 matches either the beginning address of the high-speed frame buffer 31 or the beginning address of the universal frame buffer 32.

The first frame buffer information 43 is rewritten by the display switching unit 21 as necessary. Accordingly, the first frame buffer information 43 at times matches the beginning address of the high-speed frame buffer 31. At other times, the first frame buffer information 43 matches the beginning address of the universal frame buffer 32. The same is true for the second frame buffer information 44 as for the first frame buffer information 43. The display switching unit 21 rewrites the first frame buffer information 43 and the second frame buffer information 44 so that they are complementary. In other words, when setting the first frame buffer information 43 to match the beginning address of the high-speed frame buffer 31, the display switching unit 21 sets the second frame buffer information 44 to match the beginning address of the universal frame buffer 32. Conversely, when setting the first frame buffer information 43 to match the beginning address of the universal frame buffer 32, the display switching unit 21 sets the second frame buffer information 44 to match the beginning address of the high-speed frame buffer 31. The first rendering capability information 41 and the second rendering capability information 42 are described later.

(2) Software Section

Frame Buffer Management Unit 11

In accordance with the number of applications using frame buffers and the number of components included in the applications, the frame buffer management unit 11 allocates an area of the high-speed memory device 18 as the high-speed frame buffer 31. The frame buffer management unit 11 similarly allocates an area of the universal memory device 19 as the universal frame buffer 32.

In the present embodiment, by way of example, the frame buffer management unit 11 allocates the same number of frame buffers as the number of components using the frame buffers. However, the number of frame buffers may be different. When each application or component uses a plurality of buffers, the necessary number of buffers may be allocated. Furthermore, allocation of frame buffers may be static or dynamic.

The frame buffer management unit 11 stores the beginning address of the allocated high-speed frame buffer 31 as a high-speed frame buffer beginning address 114. The frame buffer management unit 11 stores the beginning address of the allocated universal frame buffer 32 as a universal frame buffer beginning address 115.

Application Unit 13

The application unit 13 is provided with two components, a first rendering component 61 and a second rendering component 62, and with a processing control unit 63. In the present embodiment, two rendering components are executed, the first rendering component 61 and the second rendering component 62. The number of rendering components is not limited to two, however. The number may be three or more.

By way of example, the application unit 13 is an application with the functions of displaying a map and displaying a photograph. The first rendering component 61 has the function of displaying the map. The second rendering component 62 has the function of displaying the photograph. The combination management unit 14 superimposes the photograph generated by the second rendering component 62 onto the map separately generated by the first rendering component 61. In this way, in addition to the map being displayed across the entire display area of the display 35, a photograph taken at a certain spot on the map is displayed near that spot on the map. Two images, the map and the photograph, are thus displayed in overlap.

The first rendering component 61 is provided with a first rendering engine 71 and a first execution management unit 72.

The first rendering engine 71 performs rendering using the buffer indicated by the first frame buffer information 43 stored in the information storage unit 17.

The first execution management unit 72 is a processor that manages rendering by the first rendering component 61. The first execution management unit 72 issues rendering commands to the first rendering engine 71. The first execution management unit 72 also stores the first rendering capability information 41 in the information storage unit 17.

The first rendering capability information 41 is information regarding the rendering capability of the first rendering component 61. The first rendering capability information 41 includes information on the time necessary for rendering, rendering interval, and starting time of previous rendering. The time necessary for rendering indicates the time from the start of generation of image data to be rendered until writing of generated image data in the frame buffer. The rendering interval indicates the time interval for rendering the image data. For example, if the rendering component processes frames at 15 frames per second (fps), the rendering interval is ¹⁄₁₅ seconds. The rendering interval is predetermined. Each time rendering is performed, the starting time of execution is recorded as the starting time of previous rendering.

The second rendering component 62 is provided with a second rendering engine 73 and a second execution management unit 74.

The second rendering engine 73 performs rendering using the buffer indicated by the second frame buffer information 44 stored in the information storage unit 17.

The second execution management unit 74 is a processor that manages rendering by the second rendering component 62. The second execution management unit 74 issues rendering commands to the second rendering engine 73. The second execution management unit 74 also stores the second rendering capability information 42 in the information storage unit 17.

The second rendering capability information 42 is information regarding the rendering capability of the second rendering component 62. The second rendering capability information 42 includes information on the time necessary for rendering, rendering interval, and starting time of previous rendering. The time necessary for rendering and the rendering interval are the same as in the description of the first rendering capability information 41.

Based on the user operation information and the like received from the input unit 16, the processing control unit 63 controls the startup, execution, suspension, and termination of the first rendering component 61 and the second rendering component 62. As necessary, the processing control unit 63 also notifies the first execution management unit 72 and the second execution management unit 74 of user operation information and the like.

Display Switching Unit 21

The display switching unit 21 includes a switching determination unit 81 and a switching performance unit 82.

The switching determination unit 81 acquires the first rendering capability information 41 and the second rendering capability information 42 from the information storage unit 17. The switching determination unit 81 refers to the first rendering capability information 41 and the second rendering capability information 42 to calculate the CPU loads when the first rendering component 61 and the second rendering component 62 each perform rendering.

The CPU load may be actually measured. However, in the present embodiment, the following simple calculation is used instead of actual measurement.

$$\text{CPU load} = \text{time necessary for rendering/rendering interval} \quad \text{(Equation 1)}$$

Based on the calculated CPU loads, the switching determination unit 81 determines whether it is necessary to switch the frame buffers used by the rendering components. When determining that buffer switching is necessary, the switching determination unit 81 requests that the switching performance unit 82 perform buffer switching. The switching determination unit 81 determines that buffer switching is necessary when the rendering component with the higher CPU load does not perform rendering using the high-speed frame buffer 31 capable of high-speed rendering. The switching determination unit 81 determines that buffer switching is not necessary when the application with the higher CPU load performs rendering using the high-speed frame buffer 31 capable of high-speed rendering.

Upon receiving the request to perform switching from the switching determination unit 81, the switching performance unit 82 acquires the beginning address of the high-speed frame buffer 31 and the beginning address of the universal frame buffer 32 from the frame buffer management unit 11. When writing the first frame buffer information 43 and the second frame buffer information 44 in the information storage unit 17, the switching performance unit 82 writes the beginning address of the high-speed frame buffer 31 as the buffer information corresponding to the rendering component that requires high-speed rendering. The switching performance unit 82 writes the beginning address of the universal frame buffer 32 as the other buffer information.

For example, if the switching determination unit 81 determines that buffer switching is necessary, and the rendering component requiring high-speed rendering is the first rendering component 61, the switching performance unit 82 writes the beginning address of the high-speed frame buffer 31 in the information storage unit 17 as the first frame buffer information 43 corresponding to the first rendering component 61. In this case, the switching performance unit 82 writes the beginning address of the universal frame buffer 32 as the second frame buffer information 44 corresponding to the second rendering component 62.

The switching performance unit 82 notifies the combination management unit 14 of a change, caused by switching of the frame buffers, in the setting for overlap during combination. The setting for overlap refers to which image to display on top: the image rendered in the high-speed frame buffer 31, or the image rendered in the universal frame buffer 32.

The following is a specific example illustrating the occurrence of buffer switching.

By performing operations on the map, a user causes the map that is displayed to be continually updated. The CPU load for the first rendering component 61 is thus higher than the CPU load for the second rendering component 62. Therefore, the first rendering component 61 uses the high-speed frame buffer 31. On the other hand, the second rendering component 62 uses the universal frame buffer 32. If the user then performs an operation to enlarge a particular photograph, the target of user operation shifts from the map to the photograph. The CPU load for the second rendering component 62 may then become higher than the CPU load for the first rendering component 61. In this case, the buffers are switched. After switching, the second rendering component 62 uses the high-speed frame buffer 31, and the first rendering component 61 uses the universal frame buffer 32.

Combination Management Unit 14

Based on the setting for overlap received from the switching performance unit 82, the combination management unit 14 combines an image generated from data stored in the high-speed frame buffer 31 with an image generated from data stored in the universal frame buffer 32. The combination management unit 14 writes the resulting combined image in the display frame buffer 33.

1.2 Operations

The following describes buffer switching by the information processing terminal 1.

Figure 2:
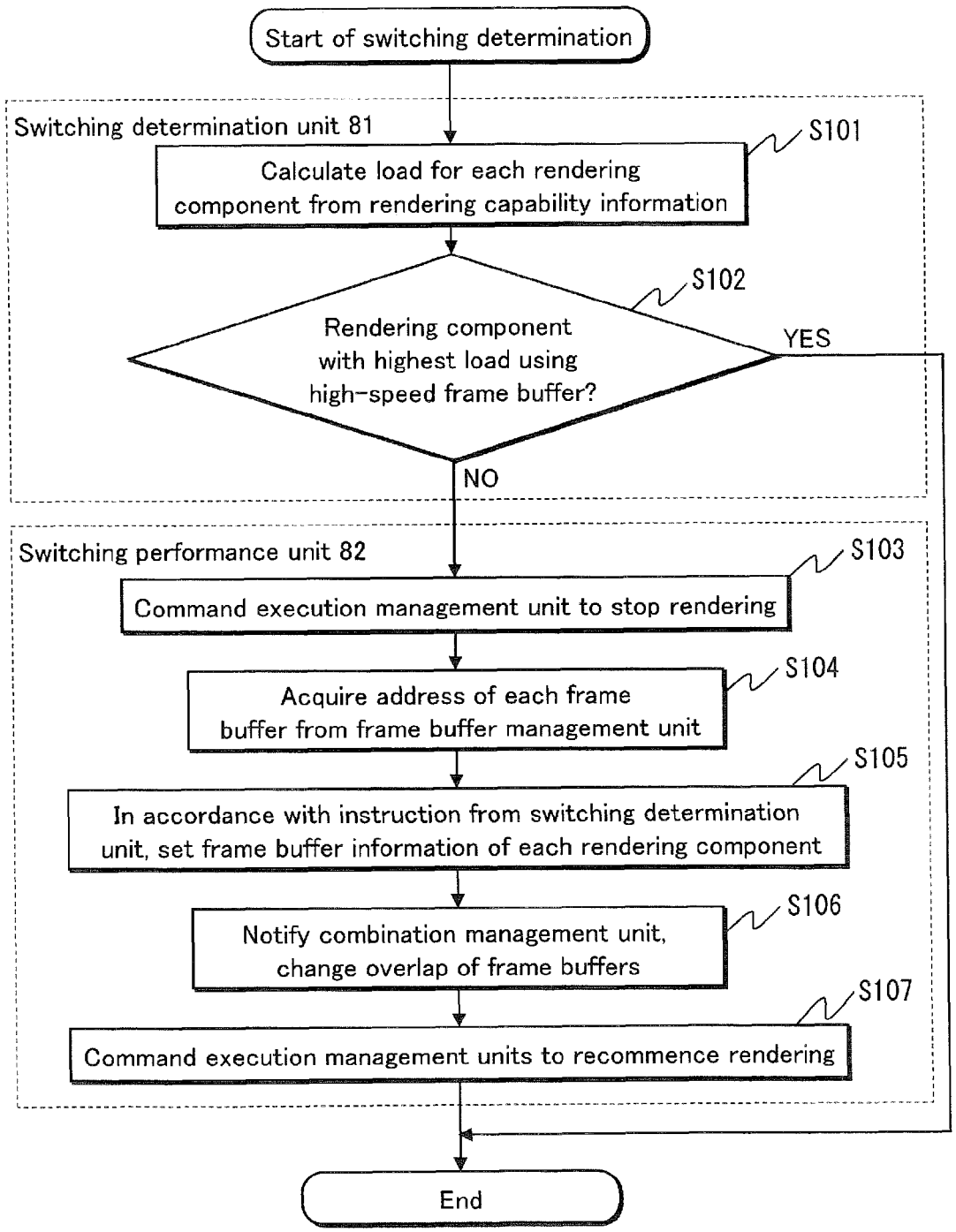
FIG. 2 is a flowchart showing an example of switching determination in the display switching apparatus according to Embodiment 1 of the present invention.

FIG. 2 is a flowchart showing the flow of buffer switching according to the present embodiment.

It is assumed that the application unit 13 is already operating in the information processing terminal 1. It is also assumed that the first rendering component 61 and the second rendering component 62 are each performing rendering. In this state, processing for buffer switching is performed at fixed intervals. However, switching is not limited in this way and may be performed at appropriate times. For example, buffer switching may be performed in response to user instruction.

First, the switching determination unit 81 acquires the first rendering capability information 41 and the second rendering capability information 42 from the information storage unit 17. Based on the acquired first rendering capability information 41 and second rendering capability information 42, the switching determination unit 81 calculates the CPU loads for the first rendering component 61 and the second rendering component 62 using the above Equation 1 (S101).

Next, the switching determination unit 81 compares the CPU load for the first rendering component 61 and the CPU load for the second rendering component 62. The switching determination unit 81 thus determines whether the rendering component with the highest CPU load is rendering into the high-speed frame buffer 31 (S102). Specifically, the switching determination unit 81 determines whether the frame buffer information (either the first frame buffer information 43 or the second frame buffer information 44) corresponding to the rendering component with the highest CPU load (either the first rendering component 61 or the second rendering component 62) matches the beginning address of the high-speed frame buffer. When the frame buffer information and the beginning address of the high-speed frame buffer match, the rendering component with the highest CPU load is rendering into the high-speed frame buffer 31. When they do not match, the rendering component with the highest CPU load is not rendering into the high-speed frame buffer 31.

If the rendering component with the highest CPU load is rendering into the high-speed frame buffer 31 (S102: YES), the switching determination unit 81 determines that buffer switching is not necessary. Processing for buffer switching terminates. On the other hand, when determining that the rendering component with the highest CPU load is not rendering into the high-speed frame buffer 31 (S102: NO), the switching determination unit 81 determines that buffer switching is necessary. The switching determination unit 81 then issues a request for execution of buffer switching to the switching performance unit 82.

Having received the request for execution of buffer switching, the switching performance unit 82 issues, to the first execution management unit 72 and the second execution management unit 74, an inquiry regarding the execution state (i.e. whether rendering is in progress). After rendering by both the first rendering component 61 and the second rendering component 62 is complete, the switching performance unit 82 commands the first execution management unit 72 and the second execution management unit 74 not to perform rendering (S103). This is because issuing an instruction to suspend rendering that is in progress disrupts the images shown on the display 35. Note than when neither the first rendering component 61 nor the second rendering component 62 is currently rendering, the switching performance unit 82 immediately issues a command not to perform rendering.

Next, the switching performance unit 82 acquires the beginning address of the high-speed frame buffer 31 and the beginning address of the universal frame buffer 32 from the frame buffer management unit 11 (S104).

The switching performance unit 82 then rewrites the frame buffer information (the first frame buffer information 43 or the second frame buffer information 44), corresponding to the rendering component (either the first rendering component 61 or the second rendering component 62) determined by the switching determination unit 81 in S102 to have the higher CPU load, with the beginning address of the high-speed frame buffer 31. The switching performance unit 82 also overwrites the frame buffer information corresponding to the rendering component not determined to have the higher CPU load with the beginning address of the universal frame buffer 32 (S105).

In this way, the rendering component determined to have the higher CPU load is assigned the high-speed frame buffer (the high-speed frame buffer 31) and uses the high-speed frame buffer 31 for subsequent rendering.

Next, the switching performance unit 82 notifies the combination management unit 14 and changes the setting for overlap when combining the high-speed frame buffer 31 and the universal frame buffer 32 (S106). For example, before switching, suppose that a map is stored in the high-speed frame buffer 31 and a photograph in the universal frame buffer 32. Further suppose that the photograph stored in the universal frame buffer 32 is displayed superimposed on the map stored in the high-speed frame buffer 31. In this case, after switching, the map is stored in the universal frame buffer 32, and the photograph is stored in the high-speed frame buffer 31. If the setting for overlap is not changed, the map stored in the universal frame buffer 32 is displayed superimposed on the photograph stored in the high-speed frame buffer 31. As a result, only the map is shown on the display 35. In order to avoid this situation, the setting for overlap is changed so as to reverse the order in which the image stored in the high-speed frame buffer 31 and the image stored in the universal frame buffer 32 are superimposed one on the other.

Finally, the switching performance unit 82 commands the first execution management unit 72 and the second execution management unit 74 to recommence rendering (S107). After recommencing rendering, the rendering component determined by the switching determination unit 81 in S102 to have the higher CPU load performs rendering using the high-speed frame buffer 31.

With the present structure, while an application having a plurality of rendering components is running, even if the size of the CPU processing load of the rendering components changes due to user operation or the like, the rendering component with the highest CPU load continually renders into the high-speed frame buffer 31. Since the high-speed frame buffer 31 has the shortest time necessary for rendering, the present structure reduces the CPU load and shortens the processing time for rendering. This increases the frame rate and improves response to user operations.

2. Embodiment 2

In Embodiment 1, the determination of whether to switch the buffers is made in accordance with the CPU load. In Embodiment 2, when it is determined that buffer switching in necessary, the most appropriate of a plurality of pre-established buffer switching procedures is furthermore selected. Buffers are switched according to the selected buffer switching procedure. The most appropriate buffer switching procedure is selected by predicting rendering delay, dropped frames, and CPU load for each switching procedure. A comprehensive determination is then made based on the predictions.

The plurality of buffer switching procedures refers to the following three procedures. (1) Switching the buffers without copying the contents thereof back and forth (hereinafter, "first switching procedure"). (2) Copying the content of the buffer used by the first rendering component 61 into the buffer used by the second rendering component 62 and then switching buffers (hereinafter, "second switching procedure"). (3) Copying the content of the buffer used by the second rendering component 62 into the buffer used by the first rendering component 61 and then switching buffers (hereinafter, "third switching procedure"). For the sake of convenience, a procedure to continue rendering without switching buffers is referred to as a "fourth switching procedure".

Note that during the first switching procedure, the contents stored in the buffers immediately before selection of the buffer switching procedure are discarded. Therefore, the first rendering component 61 and the second rendering component 62 each perform rendering anew using a different frame buffer than the buffer used immediately before selection of the buffer switching procedure.

2.1 Structure

Figure 3:
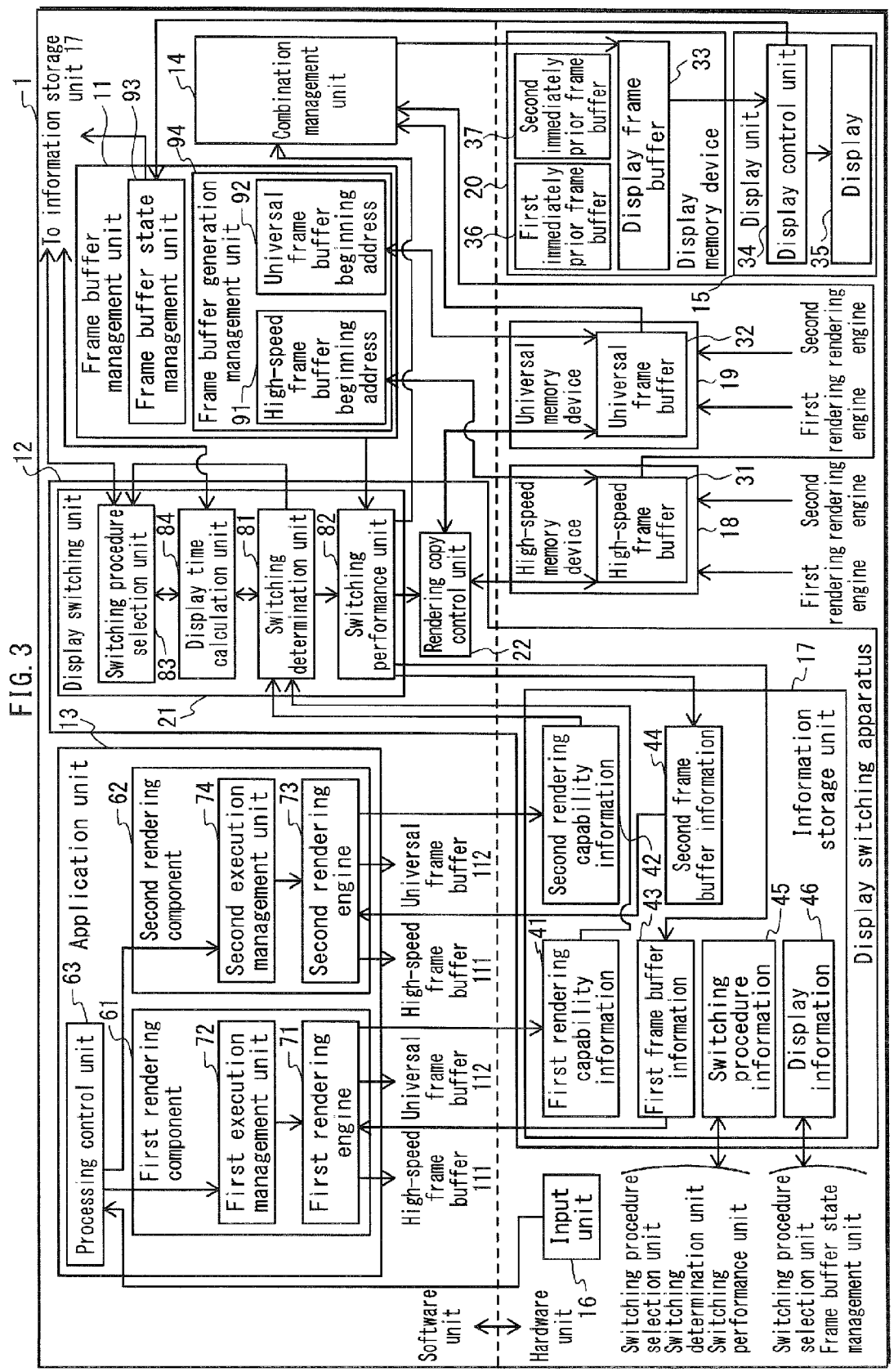
FIG. 3 is a block diagram showing an example of the structure of an information processing terminal provided with the display switching apparatus according to Embodiment 2 of the present invention.

FIG. 3 is a block diagram showing an example of the structure of the information processing terminal 1 in Embodiment 2 of the present invention.

In FIG. 3, the same reference signs are used for the same constituent elements as in FIG. 1, and duplicate explanations are omitted.

The information processing terminal 1 according to the present embodiment differs from the structure of Embodiment 1 in the following points.

(1) A frame buffer generation management unit 94 and a frame buffer state management unit 93 are provided in the frame buffer management unit 11. Note that the frame buffer generation management unit 94 corresponds to the frame buffer management unit 11 in Embodiment 1.

(2) A rendering copy control unit 22 is additionally provided.

(3) A switching procedure selection unit 83 and a display time calculation unit 84 are additionally provided in the display switching unit 21.

(4) Switching procedure information 45 and display information 46 are added to the information stored in the information storage unit 17.

(5) A first immediately prior frame buffer 36 and a second immediately prior frame buffer 37 are provided in the display memory device 20.

(6) The display switching apparatus 12 is formed by the information storage unit 17, the display switching unit 21, and the rendering copy control unit 22.

The following description focuses on these differences.

Frame Buffer Management Unit 11

The frame buffer management unit 11 is provided with the frame buffer state management unit 93 and the frame buffer generation management unit 94.

The frame buffer state management unit 93 acquires the display information 46 from the display control unit 34. The frame buffer state management unit 93 then records the display information 46 in the information storage unit 17. In the present embodiment, the display control unit 34 updates the latest refresh time at each refresh time. The display control unit 34 notifies the frame buffer state management unit 93 of the most recent display information 46, which includes the updated latest refresh time, at each refresh time.

In accordance with the number of applications using frame buffers and the number of components included in the applications, the frame buffer generation management unit 94 allocates an area of the high-speed memory device 18 as the high-speed frame buffer 31. Similarly, the frame buffer generation management unit 94 allocates an area of the universal memory device 19 as the universal frame buffer 32. The frame buffer generation management unit 94 also stores the beginning address of the allocated high-speed frame buffer 31 as a high-speed frame buffer beginning address 114. The frame buffer generation management unit 94 stores the beginning address of the allocated universal frame buffer 32 as a universal frame buffer beginning address 115. In the present embodiment, the frame buffer generation management unit 94 allocates the same number of frame buffers as the number of components using the frame buffers. Specifically, the frame buffer generation management unit 94 allocates two frame buffers: the high-speed frame buffer 31 in the high-speed memory device 18, and the universal frame buffer 32 in the universal memory device 19. However, allocation of two frame buffers is only to simplify description. Allocation is not limited in this way. When each application or component uses a plurality of buffers, the necessary number of buffers, instead of just two, may be allocated. Alternatively, a portion of the necessary number of buffers may be allocated. Furthermore, allocation of frame buffers may be static or dynamic. Note also that allocating frame buffers on the high-speed frame buffer 31 insofar as the memory region of the high-speed frame buffer 31 permits increases rendering performance.

The frame buffer generation management unit 94 also stores a first conversion coefficient and a second conversion coefficient. The first conversion coefficient converts the time necessary for rendering using the high-speed frame buffer 31 into a time necessary for the same rendering using the universal frame buffer 32. The second conversion coefficient converts the time necessary for rendering using the universal frame buffer 32 into a time necessary for the same rendering using the high-speed frame buffer 31. For example, in order to perform the same rendering, if 0.1 seconds are required using the high-speed frame buffer 31 and 0.2 seconds are required using the universal frame buffer 32, the first conversion coefficient is 2, and the second conversion coefficient is 0.5.

Rendering Copy Control Unit 22

In accordance with a copy request, the rendering copy control unit 22 copies the content of one of the high-speed frame buffer 31 and the universal frame buffer 32 into the other, or swaps the contents recorded therein by copying the content of each buffer into the other.

Display Switching Unit 21

In addition to the switching determination unit 81 and the switching performance unit 82, the display switching unit 21 includes the switching procedure selection unit 83 and the display time calculation unit 84.

Display Time Calculation Unit 84

The display time calculation unit 84 receives a display time calculation request from the switching procedure selection unit 83 indicating one of the first through the fourth switching procedures. The display time calculation unit 84 calculates the starting time and the ending time of rendering regularly performed by the first rendering component 61 and by the second rendering component 62. The display time calculation unit 84 also calculates the refresh time at which to display images that are generated by each rendering process and written to a buffer. Based on the information calculated by the display time calculation unit 84, the switching procedure selection unit 83 comprehensively evaluates the delayed display of images, dropped frames, and increase in CPU load for each of the switching procedures. The switching procedure selection unit 83 then selects one of the switching procedures.

Figure 4:
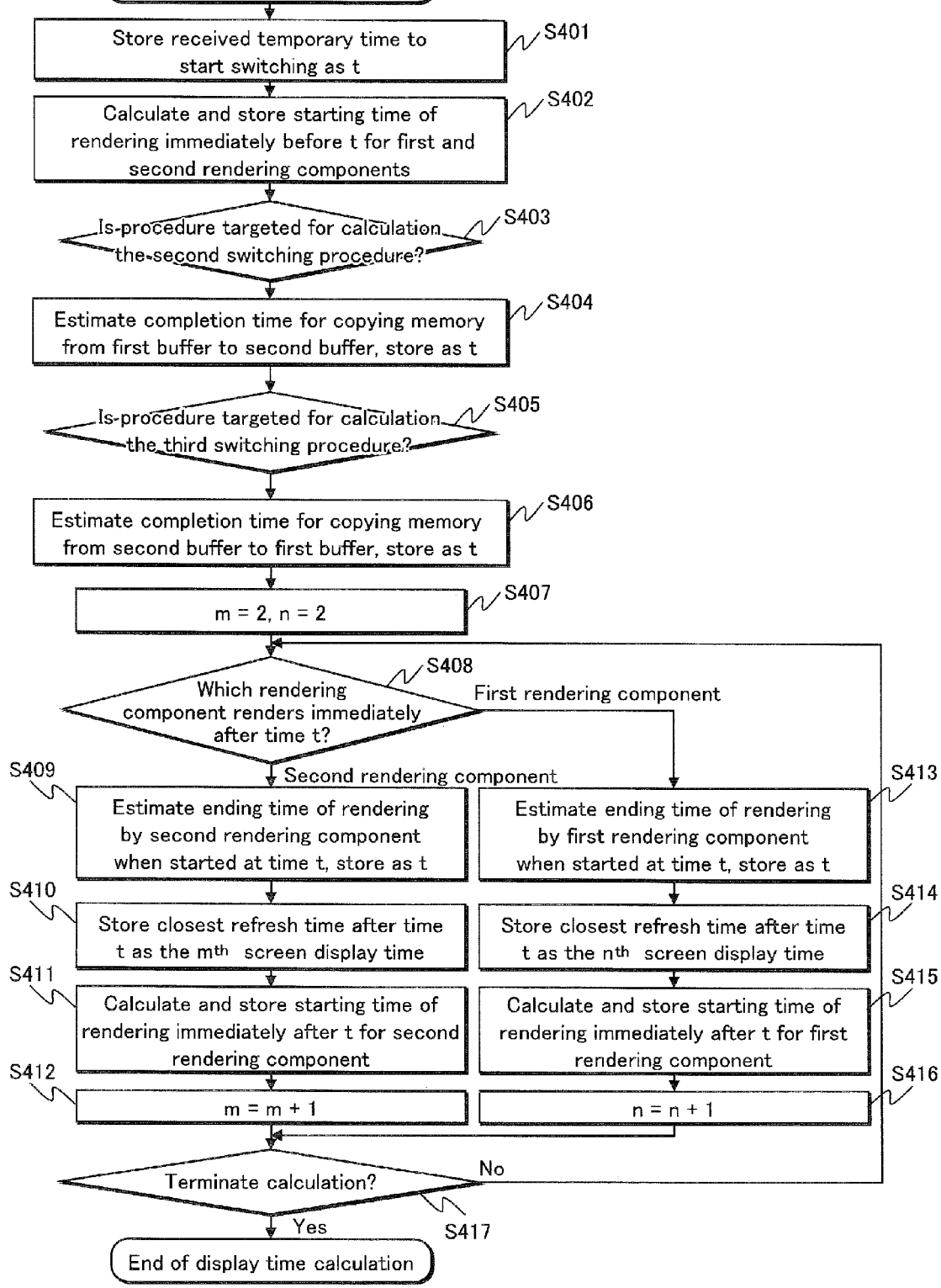
FIG. 4 is a flowchart showing an example of display time calculation in the display switching apparatus according to Embodiment 2 of the present invention.

FIG. 4 is a flowchart showing the procedure for display time calculation by the display time calculation unit 84.

Figure 5:
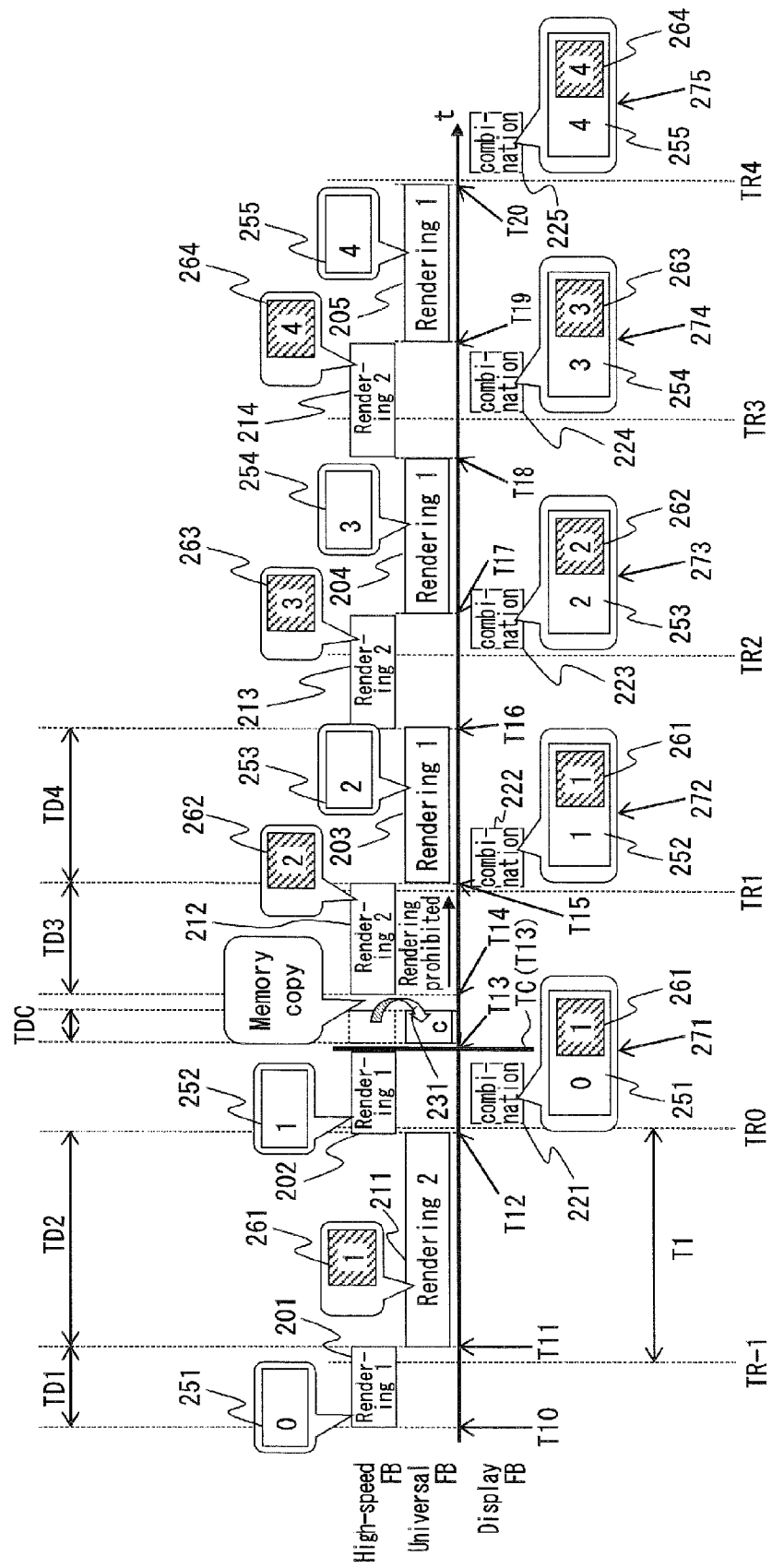
FIG. 5 is a timing chart showing rendering during a second switching procedure according to Embodiment 2 of the present invention.

FIG. 5 is a timing chart showing rendering during the second switching procedure. Graphics schematically representing rendered screen images are shown alongside the timing chart.

For the sake of convenience, FIG. 5 is described first. The flowchart in FIG.

4 is then described with reference to FIG. 5, using the example of when the first switching procedure is indicated.

The horizontal axis t of FIG. 5 represents time.

The vertical axis of FIG. 5 is divided into three sections: high-speed FB (frame buffer), universal FB, and display FB. The high-speed FB section indicates that rendering is performed using the high-speed frame buffer 31. The universal FB section indicates that rendering is performed using the universal frame buffer 32. The display FB section indicates that rendering is performed using the display frame buffer 33.

In FIG. 5, TRa (a being an integer, and in FIG. 5, a=−1, 0, 1-5) indicates refresh times. The interval between each refresh time is a constant time T1. T1 is the refresh interval included in the display information 46. T1 is determined based on the performance, specifications, and the like of the display.

Each rendering b bar (b=1, 2) indicates that the $b^{th}$ rendering component performs rendering during the processing period indicated by the width along the time axis of the bar.

For example, rendering 1bar 201 indicates that the first rendering component 61 performs rendering during the processing period (TD1) indicated by the width along the time axis of the bar. The rendering 1bar 201 is contained in the high-speed FB section. Therefore, corresponding rendering is performed using the high-speed frame buffer 31. Processing indicated by the rendering 1bar 201 starts at time T10 and ends at time T11. The same is true for rendering 1bars 202-205 as for rendering 1bar 201. Rendering 1bars 203-205, however, are contained in the universal FB section. Therefore corresponding rendering is performed using the universal frame buffer 32. The processing period (TD4) for the rendering 1bars 203-205 is longer than for the rendering 1bars 201-202 which use the high-speed frame buffer 31 (TD1<TD4).

Rendering 2bar 211 indicates that the second rendering component 62 performs rendering during the processing period (TD2) indicated by the width along the time axis of the bar. Rendering 2bar 211 is contained in the universal FB section. Therefore corresponding rendering is performed using the universal frame buffer 32. Processing indicated by the rendering 2bar 211 starts at time T11, at which time rendering indicated by the rendering 1bar 201 ends, and ends at time T12. The same is true for rendering 2bars 212-214 as for rendering 2bar 211. Rendering 2bars 212-214, however, are contained in the high-speed FB section. Therefore corresponding rendering is performed using the high-speed frame buffer 31. The processing period (TD3) is shorter than for rendering 2bar 211 (TD2>TD3).

Like T10-T12, T13-T20 indicate the start and end of rendering processes.

A combined bar 221 indicates that, during the period indicated by the width along the time axis of the bar, the combination management unit 14 generates a combined image, and the display control unit 34 displays the combined image on the display 35. The rendering shown by the combined bar 221 starts at refresh time TR0. The combined bar 221 is included in the display FB section. This indicates that rendering is performed using the display frame buffer 33. The same is true for the combined bars 222-225 as for the combined bar 221.

A memory copy bar 231 indicates that the rendering copy control unit 22 copies the content of the high-speed frame buffer 31 into the universal frame buffer 32 during the period indicated by the width along the time axis of the bar. TDC indicates the time necessary for copying.

The rectangle (image 251) shown in a balloon extending from the rendering 1 bar 201 schematically represents the image data written by the first rendering component 61 into the frame buffer and the screen image shown on the display 35 based on the image data. The number "0" in the image 251 indicates a number (frame number) assigned to the image that the first rendering component 61 writes. Note that the frame number is simply used to conveniently indicate the relative order of images. The frame number itself has no particular meaning.

Similarly, the rectangle (image 261) shown in a balloon extending from the rendering 2 bar 211 schematically represents the image data written by the second rendering component 62 into the frame buffer and the screen image shown on the display 35 based on the image data. The number "1" in the image 261 indicates the frame number assigned to the image that the second rendering component 62 writes.

The rectangle (image 271) shown in a balloon extending from the combined bar 221 schematically represents the image written by the combination management unit 14 into the display frame buffer 33. The image 271 is the result of superimposing image 261 on top of image 251.

The same is true for images 252-255 as for image 251. The same is also true for images 262-264 as for image 261. Furthermore, the same is true for images 272-275 as for image 271.

Next, with reference to FIG. 5, operations are described in accordance with the flowchart in FIG. 4.

During the display time calculation in FIG. 4, as described above, the starting times and the ending times (T11-T20) of rendering regularly performed by the first rendering component 61 and by the second rendering component 62 are calculated. The refresh times (TR0-TR4 and so forth) at which to display the images generated during rendering and written into the buffers (images 251-255, images 261-264, and the like) are also calculated.

Specifically, the switching procedure selection unit 83 transmits a display time calculation request indicating a procedure targeted for calculation to the display time calculation unit 84. The display time calculation request includes a temporary time to start switching. The procedure targeted for calculation indicates one of the first through the fourth switching procedures. In this example, the procedure targeted for calculation is assumed to be the second switching procedure. The switching procedure selection unit 83 determines the temporary time to start switching as follows. If neither the first rendering component 61 nor the second rendering component 62 is in the process of rendering when the switching procedure selection unit 83 is about to transmit the display time calculation request, the switching procedure selection unit 83 sets the temporary time to start switching to the current time. If either of the first rendering component 61 or the second rendering component 62 is in the process of rendering, the switching procedure selection unit 83 sets the temporary time to start switching to be immediately after the end of rendering. In the example in FIG. 5, the switching procedure selection unit 83 includes the time TC (T13), immediately after the end of rendering, in the display time calculation request as a temporary time to start switching Note that the value of a in the refresh time TRa (a being an integer) is assigned by taking the refresh time immediately before TC to be TR0. The frame number is assigned in order with the frame number of the image rendered immediately before TC being 1.

The display time calculation unit 84 begins processing after receiving the display time calculation request from the switching procedure selection unit 83. The display time calculation unit 84 stores the temporary time to start switching included in the display time calculation request as a variable t (S401).

Next, the display time calculation unit 84 acquires first rendering capability information 41 and the second rendering capability information 42 from the information storage unit 17. The display time calculation unit 84 calculates the starting time of rendering immediately before t for the first rendering component 61 (S402). In the example in FIG. 5, the starting time of rendering is the starting time T12 of the rendering 1 bar 202 shown by the starting time of previous rendering included in the first rendering capability information 41. The display time calculation unit 84 prepares integer variables m and n. The variable m indicates the serial number of the image rendered by the second rendering component. The variable n indicates the serial number of the image rendered by the first rendering component. The frame number (n) of the image at the starting time calculated in S402 is set to 1.

The display time calculation unit 84 similarly calculates the starting time of rendering immediately before t for the second rendering component 62 (S402). In the example in FIG. 5, the starting time of rendering is the starting time T11 of the rendering 2bar 211 shown by the starting time of previous rendering included in the second rendering capability information 42. The frame number (m) of the image at the starting time calculated in S403 is set to 1.

Next, the display time calculation unit 84 determines whether the procedure targeted for calculation is the second switching procedure (S403). If so (S403: YES), the display time calculation unit 84 calculates the completion time (T14) were the content stored in the high-speed frame buffer 31 to be copied into the universal frame buffer 32. The display time calculation unit 84 stores the result as t (S404). It is assumed that the time TDC necessary for copying the content stored in the high-speed frame buffer 31 into the universal frame buffer 32 is known.

Next, the display time calculation unit 84 determines whether the procedure targeted for calculation is the third switching procedure (S405). If so (S405: YES), the display time calculation unit 84 calculates the completion time were the content stored in the universal frame buffer 32 to be copied into the high-speed frame buffer 31 and stores the result as t (S406). It is assumed that the time necessary for copying the content stored in the universal frame buffer 32 into the high-speed frame buffer 31 is known.

Next, the display time calculation unit 84 sets m and n to 2 (S407).

The display time calculation unit 84 then determines which rendering component performs rendering at a time after time t and closest to time t (S406).

When the rendering component is determined to be the first rendering component 61 in S408, processing proceeds to S411. When the rendering component is determined to be the second rendering component 62, processing proceeds to S409. In the case of FIG. 5, the rendering component that starts rendering at the closest time to time t (=TC) is the second rendering component 62, which starts rendering at starting time T14, the closest time to the time t.

When the rendering component is determined to be the second rendering component 62 in S408 (S408: second rendering component), the display time calculation unit 84 calculates the ending time of rendering that starts at the closest time to the time t. The display time calculation unit 84 rewrites t to be the calculated time (S409).

In the case of FIG. 5, the ending time of rendering is T15, the end of the rendering 2 bar 212, and thus t is rewritten to be T15.

Note that the time required for the processing shown by each rendering bar after TC is only an estimate made at the time TC. Furthermore, although not all rendering processes are always the same, the time required as measured for the rendering previous to time t is considered to be the time required for subsequently performed rendering. When the frame buffer used during the previous rendering and the frame buffer used during subsequent rendering differ, however, the time required as measured for the previous rendering cannot be considered to be the time required for subsequently performed rendering. Accordingly, the time required as measured for the previous rendering is multiplied by the first or the second conversion coefficient and then considered to be the time required for subsequently performed rendering. Note that the processing time for rendering may alternatively be a predetermined time, an average time for rendering, or the like.

Next, the display time calculation unit 84 acquires the display information 46 from the information storage unit 17. The display time calculation unit 84 then calculates the closest refresh time after the time t by referring to the latest refresh time included in the display information 46. The display time calculation unit 84 stores the refresh time as the $m^{th}$ screen display time for the second rendering component 62 (S410). In the example in FIG. 5, t is set to T15 in S409. The closest refresh time TRa (a=2) after T15 is the $m^{th}$ (m=2) refresh time for the second rendering component 62. The value of a at this time is stored as the screen display time.

Next, the display time calculation unit 84 calculates and stores the starting time of rendering for the $m^{th}$ rendering frame of the second rendering component 62 (S411). In the case of FIG. 5, the $m^{th}$ (m=2) starting time of rendering for the second rendering component 62 is T14.

Through the above steps S409-S411, the display time calculation unit 84 calculates the starting time of rendering and the ending time of rendering of the $m^{th}$ (m=2) image for the second rendering component 62, and the refresh time at which the $m^{th}$ (m=2) image is displayed.

Next, the display time calculation unit 84 increments m by one (S412), and processing proceeds to S417.

Based on time t, the display time calculation unit 84 determines whether to perform the processing from steps S409 to S412, or from S414 to S416, again (S417). The basis for the determination is whether t has reached a predetermined upper limit. The upper limit may be reset based on the time required for the above processing.

When it is determined in S417 to perform processing again (S417: NO), processing proceeds to S408. When it is determined not to perform processing again (S417: YES), processing terminates. In the present embodiment, the upper limit is set so that the result of S417 will be NO. Therefore calculation does not terminate until m and n reach 4.

In the example in FIG. 5, when processing first proceeds to S408 from S417, the value of t is T15. Therefore in S408, the rendering component that performs rendering immediately after time t is determined to be the first rendering component 61. In this case, steps S413- S416 are the same as the above-described steps S409-S412 for the second rendering component 62, replacing the second rendering component 62 with the first rendering 10 component 61 and replacing the variable m with n. Further description of steps S413-S416 is therefore omitted. Through the above steps S413-S415, the display time calculation unit 84 calculates the starting time of rendering and the ending time of rendering of the $n^{th}$ (n =2) image for the first rendering component 61, and the refresh time at which the $n^{th}$ (n=2) image is displayed.

As a result of the above processing, the starting time of rendering and ending time of rendering of images, and the refresh time at which images are displayed, are calculated for m, n=1-4 for the second rendering component 62 and the first rendering component 61.

Figure 6:
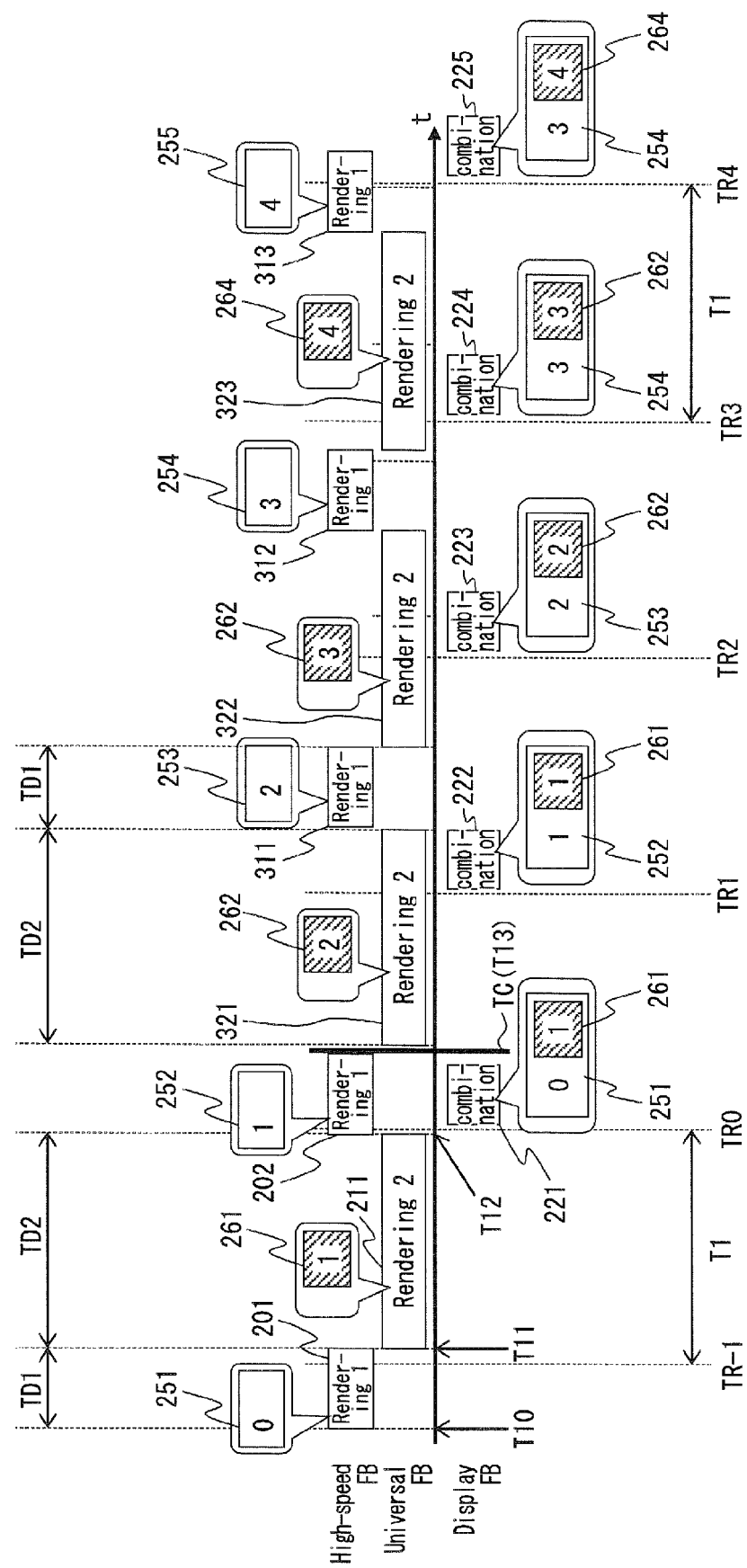
FIG. 6 is a timing chart showing rendering during a fourth switching procedure according to Embodiment 2 of the present invention.

FIG. 6 is a timing chart showing rendering during the fourth switching procedure.

Interpretation of the graphics, reference signs, and the like is the same for FIG. 6 as for FIG. 5.

The major differences between the fourth switching procedure in FIG. 6 and the second switching procedure in FIG. 5 are that the copying of memory represented by the memory copy bar 231 in FIG. 5 is not performed, and that the memory buffers used by the first rendering component 61 and the second rendering component 62 are not switched at TC.

By using the flowchart in FIG. 4 for the fourth switching procedure as well, the starting time of rendering and ending time of rendering of images, and the refresh times at which images are displayed, are calculated for m, n=1-4 for rendering of the rendering 1bars 201-202 and 311-313 and the rendering 2 bars 211 and 321-323.

Figure 7:
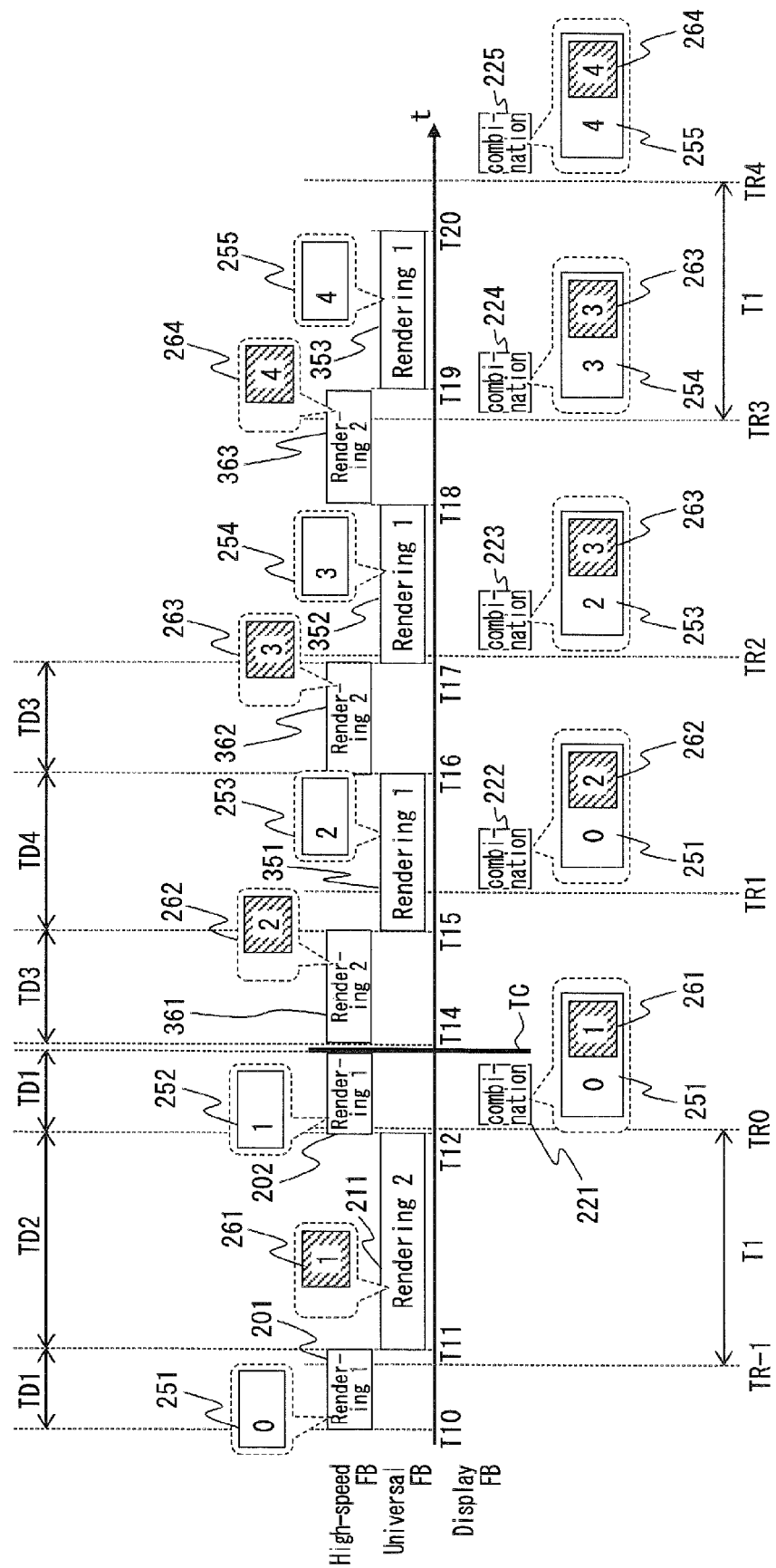
FIG. 7 is a timing chart showing rendering during a first switching procedure according to Embodiment 2 of the present invention.

FIG. 7 is a timing chart showing rendering during the first switching procedure.

Interpretation of the graphics, reference signs, and the like is the same for FIG. 7 as for FIG. 5.

The major difference between the first switching procedure in FIG. 7 and the second switching procedure in FIG. 5 is that the copying of memory represented by the memory copy bar 231 in FIG. 5 is not performed.

By using the flowchart in FIG. 4 for the first switching procedure as well, the starting time of rendering and ending time of rendering of images, and the refresh times at which images are displayed, are calculated for m, n=1-4 for rendering of the rendering 1bars 201-202 and 361-363 and the rendering 2 bars 211 and 351-353.

Figure 8:
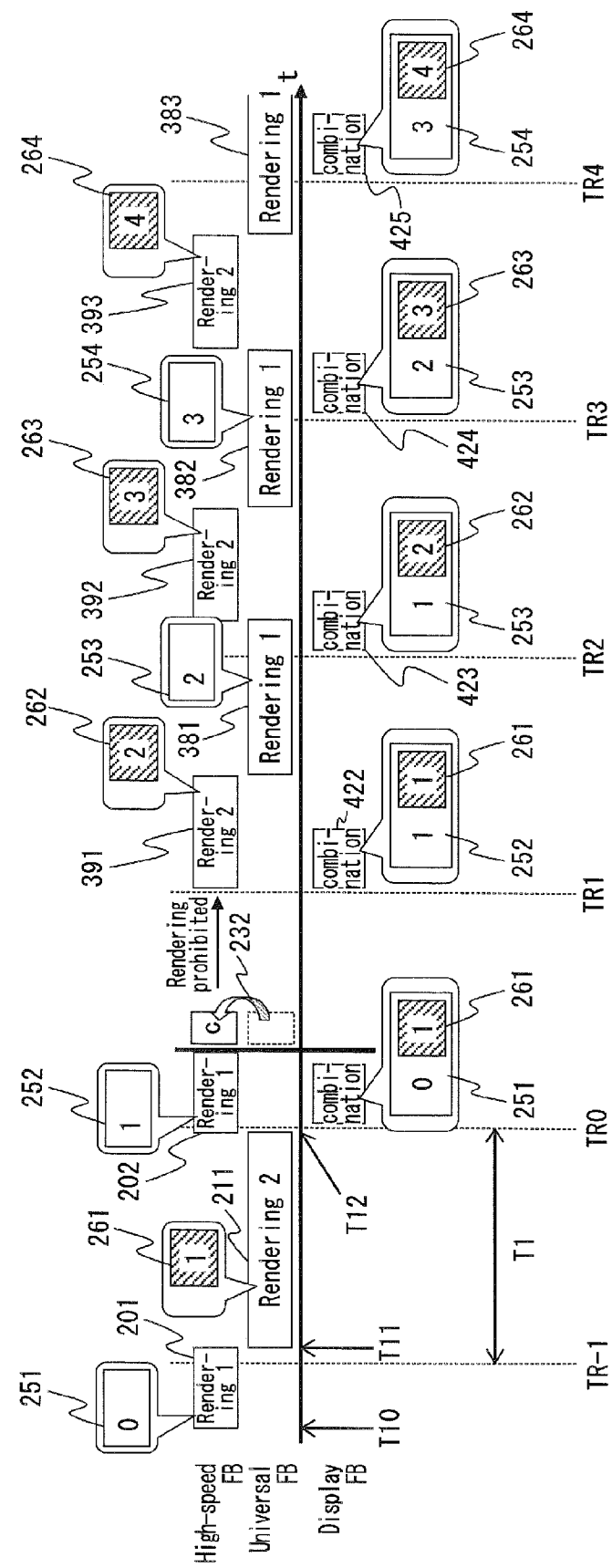
FIG. 8 is a timing chart showing rendering during a third switching procedure according to Embodiment 2 of the present invention.

FIG. 8 is a timing chart showing rendering during the third switching procedure.

Interpretation of the graphics, reference signs, and the like is the same for FIG. 8 as for FIG. 5.

The major difference between the third switching procedure in FIG. 8 and the second switching procedure in FIG. 5 is that during the copying of memory represented by the memory copy bar 231 in FIG. 5, the source and destination of copying are reversed. In other words, the content stored in the universal frame buffer 32 is copied into the high-speed frame buffer 31 (as represented by the memory copy bar 232).

By using the flowchart in FIG. 4 for the third switching procedure as well, the starting time of rendering and ending time of rendering of images, and the refresh times at which images are displayed, are calculated for m, n=1-4 for rendering of the rendering 1 bars 201-202 and 381-383 and the rendering 2bars 211 and 391-393.

FIGS. 9A-9G are tables summarizing results of display time calculation for the first through the fourth switching procedures.

FIG. 9A shows frame numbers (m, n) and refresh times (the "a" in TRa) for the first rendering component 61 and the second rendering component 62 during the fourth switching procedure. The frame numbers in FIG. 9A indicate the values of m and n.

For example, the value of cell 511 in FIG. 9A is 1. This indicates that image 223 with frame number 1 for the first rendering component 61 is displayed at refresh time TR1. The value of cell 512 in FIG. 9A is zero. This indicates that image 222 with frame number 1 for the second rendering component 62 is displayed at refresh time TR0. The value of cell 513 in FIG. 9A is 2. This indicates that image 225 with frame number 2 for the first rendering component 61 is displayed at refresh time TR2. The value of cell 514 in FIG. 9A is 2. This indicates that image 224 with frame number 2 for the second rendering component 62 is displayed at refresh time TR2. The value of cell 515 in FIG. 9A is 3. This indicates that image 227 with frame number 3 for the first rendering component 61 is displayed at refresh time TR3. The value of cell 516 in FIG. 9A is 3. This indicates that image 226 with frame number 3 for the second rendering component 62 is displayed at refresh time TR3.

FIGS. 9B, 9C, and 9D show frame numbers (m, n) and refresh times (the "a" in TRa) for the first rendering component 61 and the second rendering component 62 during the first through the third switching procedures.

In FIGS. 9B, 9C, and 9D, a delay column (cells 521, 522) not included in FIG. 9A is provided.

When using the first switching procedure, as shown in FIG. 9B, the delay column shows the delay that occurs as compared to when using the fourth switching procedure, as shown in FIG. 9A. A shorter delay is desirable.

Cell 521 in FIG. 9B lists a value of −1 for the delay.

This means that as compared to when using the fourth switching procedure, the delay for the first rendering component 61 decreases by one when using the first switching procedure. Specifically, whereas the refresh time at which the fourth frame is displayed is 5 (TR5) with the fourth switching procedure, the refresh time is 4 (TR4) with the first switching procedure.

Cell 522 in FIG. 9B lists a value of −3 for the delay.

This means that whereas the refresh time at which the frame numbers 2, 3, and 4 for the second rendering component 62 are displayed are 2 (TR2), 3 (TR3), and 4 (TR4) with the fourth switching procedure, the refresh times are 1 (TR1), 2 (TR2), and 3 (TR3) with the first switching procedure. Since each refresh time at which a frame is displayed is advanced by one, the total delay is −3.

FIGS. 9E-9G are tables showing scores for the first through the third switching procedures.

FIG. 9E is a table showing the score for the first switching procedure and corresponds to FIG. 9B.

The total delay in FIG. 9E is the total of each delay in FIG. 9B. Specifically, the total delay is the sum of the values of cells 521 and 522.

The dropped frames in FIG. 9E occur when image data is recorded in a buffer, and subsequently, before a refresh time, image data is again recorded into the same buffer.

FIG. 7 shows the first switching procedure and corresponds to FIGS. 9E and 9B. An example of dropped frames is how, in FIG. 7, image 252 is recorded in the high-speed frame buffer during rendering 1 bar 202, yet before the next refresh time, the high-speed frame buffer is overwritten with image 262 by the rendering in rendering 2 bar 361. Accordingly, the image 252 is dropped.

Whether a frame will be dropped can be determined based on whether or not, after image data is written into the high-speed frame buffer, rendering to overwrite the image data with other image data starts before the next refresh time. The results of this determination are listed in the dropped frames column of FIG. 9E.

The load in FIG. 9E indicates the CPU load.

When copying the content of one of the high-speed frame buffer and the universal frame buffer to the other, 0.1 is listed as the value of the load. This load occurs during the second switching procedure and the third switching procedure.

The score in FIG. 9E is the sum of the values of the total delay, the dropped frames, and the load.

FIG. 9F is a table showing the score for the second switching procedure and corresponds to FIG. 9C.

FIG. 9G is a table showing the score for the third switching procedure and corresponds to FIG. 9D.

Since FIGS. 9F and 9G are similar to FIG. 9E, a description thereof is omitted.

Switching Procedure Selection Unit 83

The switching procedure selection unit 83 calculates a score indicating a buffer switching cost for each of the first through the fourth switching procedures.

The switching procedure selection unit 83 acquires the results of calculation shown in FIGS. 9A through 9D from the display time calculation unit 84. Based on the results of display time calculation acquired from the display time calculation unit 84, the switching procedure selection unit 83 then calculates a score indicating a buffer switching cost for each of the first through the fourth switching procedures. The score has already been described with reference to FIGS. 9E through 9G, and therefore further description thereof is omitted.

The switching procedure selection unit 83 compares each calculated score and selects the switching procedure with the lowest score as the most appropriate switching procedure. The switching procedure selection unit 83 then stores switching procedure information 45 indicating the selected switching procedure in the information storage unit 17.

Figure 10:
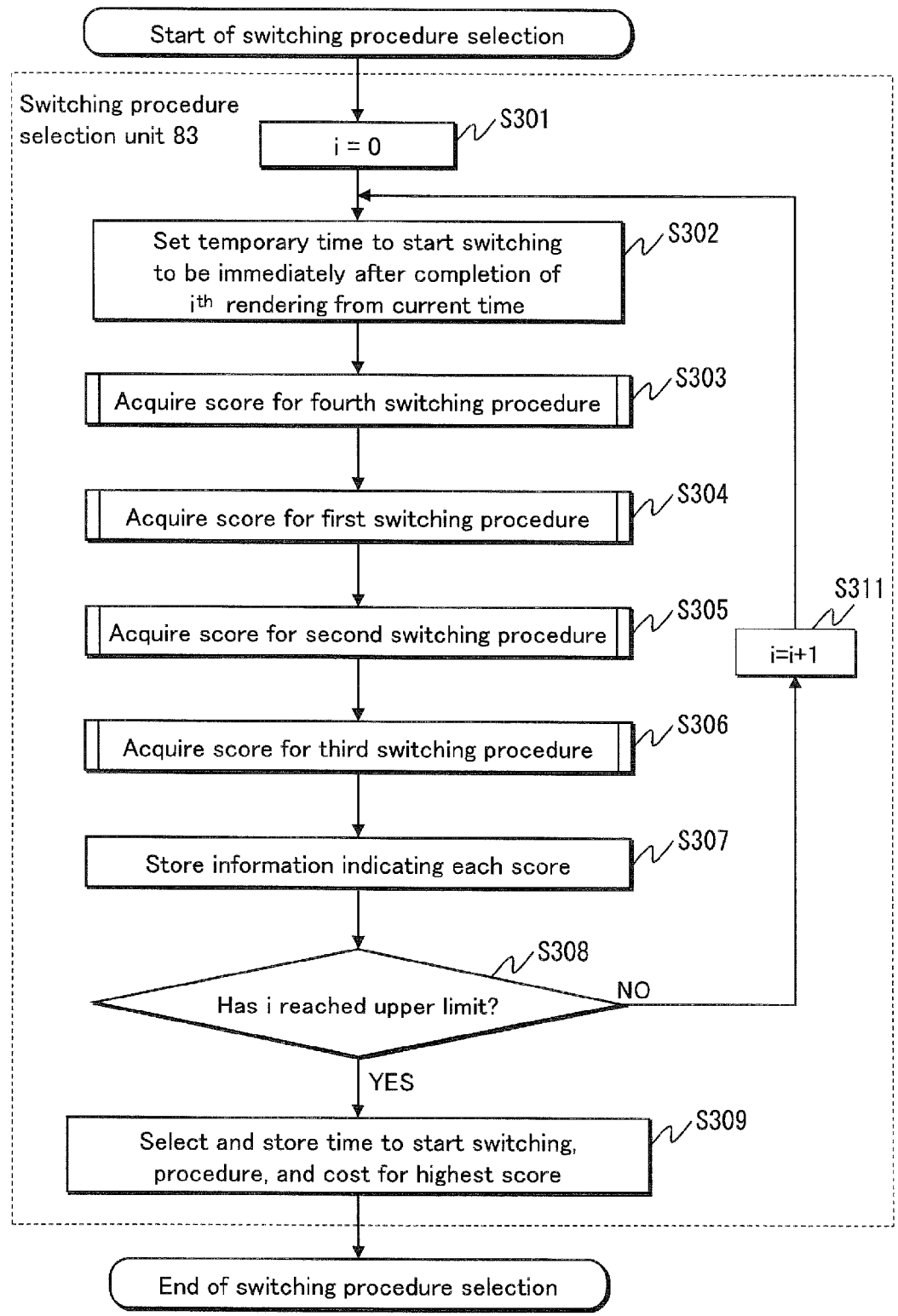
FIG. 10 is a flowchart showing an example of switching procedure selection according to Embodiment 2 of the present invention.

FIG. 10 is a flowchart of switching procedure selection by the switching procedure selection unit 83.

Upon receiving a request to start switching procedure selection from the switching determination unit 81, the switching procedure selection unit 83 starts the switching procedure selection process.

The switching procedure selection unit 83 first sets an integer variable i to an initial value of zero (S301).

The switching procedure selection unit 83 then calculates the above-described temporary time to start switching. As described above, if neither the first rendering component 61 nor the second rendering component 62 is in the process of rendering when the switching procedure selection unit 83 is about to transmit the calculation request, the switching procedure selection unit 83 sets the temporary time to start switching to the current time. If either of the first rendering component 61 or the second rendering component 62 is in the process of rendering, the switching procedure selection unit 83 sets the temporary time to start switching to be immediately after the end of rendering. If the value of i is not zero, the switching procedure selection unit 83 sets the temporary time to start switching to be immediately after rendering is performed i times by the rendering component for which the switching procedure selection unit 83 previously set the temporary time to start switching to be immediately after the end of rendering (S302).

For example, in FIG. 5, when i is zero, the temporary time to start switching is set to immediately after the end of rendering 1 bar 202, but when i is one, the temporary time to start switching is set to immediately after the end of rendering 1 bar 203, the next rendering 1 bar after rendering 1 bar 202. Note that when i is one, the temporary time to start switching may be set to immediately after the end of rendering 2 bar 212, the next rendering 2 bar after rendering 1 bar 202.

Next, the switching procedure selection unit 83 issues a display time calculation request to the display time calculation unit 84 regarding the fourth switching procedure, in which buffer switching is not performed. The switching procedure selection unit 83 then acquires the results of calculation (hereinafter, "fourth calculation results") (S303). The processing in S303 is performed as shown in the flowchart in FIG. 4. The results of calculation are shown in FIG. 9A.

Next, the switching procedure selection unit 83 issues a display time calculation request to the display time calculation unit 84 regarding the first switching procedure. The switching procedure selection unit 83 then acquires the results of calculation (hereinafter, "first calculation results") (S304). The processing in S304 is performed as shown in the flowchart in FIG. 4. The results of calculation are shown in FIG. 9B.

Next, the switching procedure selection unit 83 issues a display time calculation request to the display time calculation unit 84 regarding the second switching procedure. The switching procedure selection unit 83 then acquires the results of calculation (hereinafter, "second calculation results") (S305). The processing in S305 is performed as shown in the flowchart in FIG. 4. The results of calculation are shown in FIG. 9C.

Next, the switching procedure selection unit 83 issues a display time calculation request to the display time calculation unit 84 regarding the third switching procedure. The switching procedure selection unit 83 then acquires the results of calculation (hereinafter, "third calculation results") (S306). The processing in S306 is performed as shown in the flowchart in FIG. 4. The results of calculation are shown in FIG. 9D.

Next, the switching procedure selection unit 83 stores information indicating the scores calculated for the first through the third switching procedures (S307).

The switching procedure selection unit 83 then checks whether the value of the integer i declared in S301 has reached the upper limit. If not (S308: NO), the switching procedure selection unit 83 increments i by one and performs processing again from S302 (S308). When the upper limit has been reached (S308: YES), the procedure having the score with the best (lowest) average value over the calculations yielded by changing the value of i is selected. The time to start switching, the procedure, and the cost are stored in the information storage unit 17 as the switching procedure information 45 (S309).

Note that the upper limit of the value of i may be set to a constant threshold. Alternatively, the upper limit of i may be defined as the point at which the processing time for switching procedure selection exceeds a constant value, at which point processing proceeds to S309. The upper limit of i may also be set to one. In S309, instead of selecting the switching procedure with the best average score, the switching procedure yielding the best score may be selected.

Switching Determination Unit 81

The switching determination unit 81 compares the switching cost for the procedure selected by the switching procedure selection unit 83 with a stored threshold. If the switching cost is equal to or greater than the threshold, the switching determination unit 81 determines not to perform switching. Processing then terminates. On the other hand, if the switching cost is less than the threshold, the switching determination unit 81 determines to perform switching and issues a request to perform switching to the switching performance unit 82. Note that instead of comparing the threshold and the cost, the switching procedure selection unit 83 may simply perform buffer switching using the selected switching procedure.

2.2 Operations

The following describes display switching operations in Embodiment 2.

Figure 11:
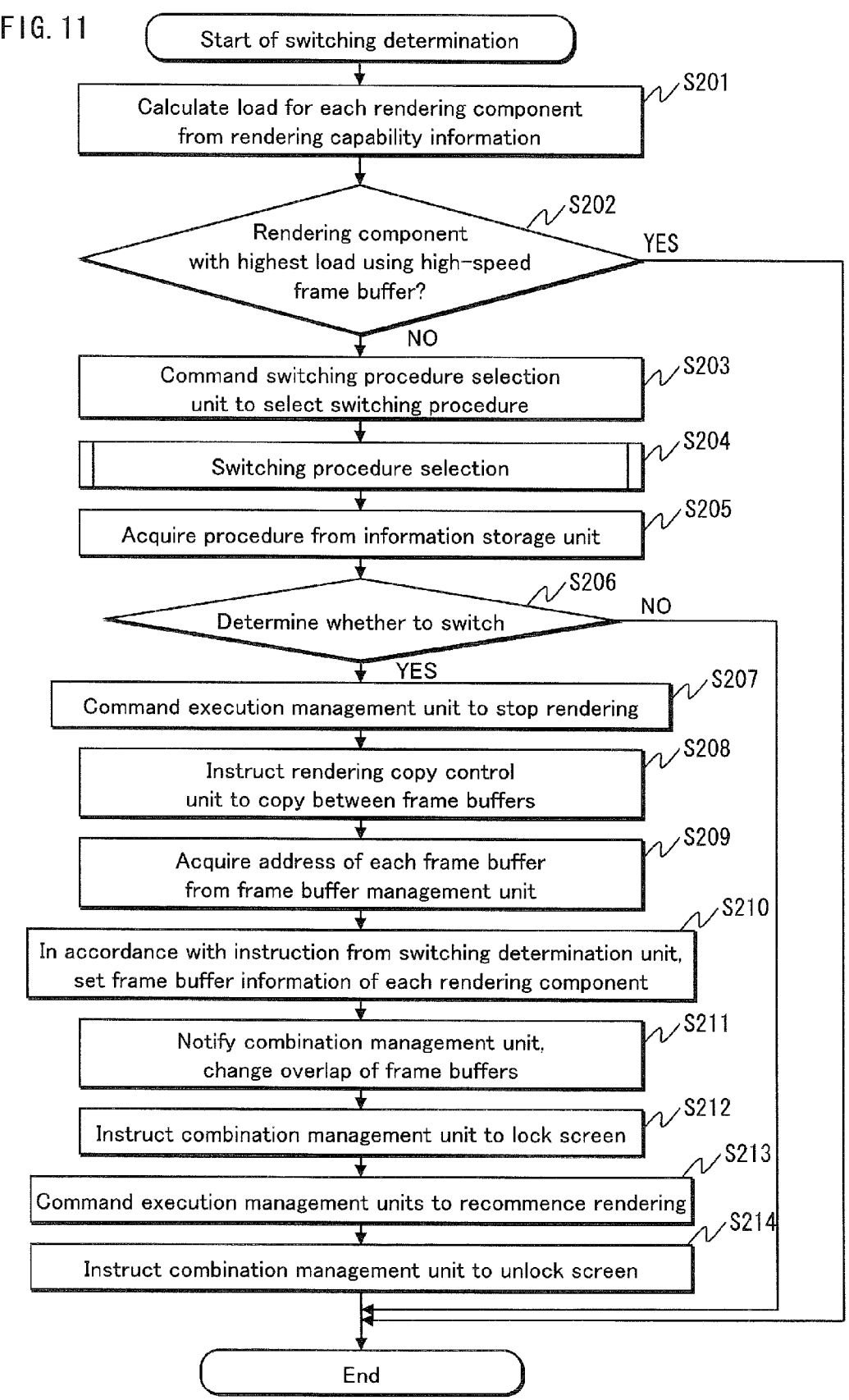
FIG. 11 is a flowchart showing an example of switching determination according to Embodiment 2 of the present invention.

FIG. 11 is a flowchart showing an example of buffer switching operations in Embodiment 2.

It is assumed that the application unit 13 is already operating in the information processing terminal 1, and that the first rendering component 61 and the second rendering component 62 are each performing rendering.

It is also assumed that the switching operations shown in FIG. 11 are performed at regular intervals, but operations are not limited in this way. A notification may be received each time a user performs operations, thus triggering the start of processing.

First, the switching determination unit 81 performs the same processing as in S101 to calculate the CPU loads for the first rendering component 61 and the second rendering component 62 (S201).

Next, the switching determination unit 81 performs the same processing as in S102 to compare the CPU load for the first rendering component 61 and the CPU load for the second rendering component 62 and determine whether the rendering component with the highest CPU load is rendering into the high-speed frame buffer 31 (S202).

If the rendering component with the highest CPU load is rendering into the high-speed frame buffer 31 (S202: YES), the switching determination unit 81 determines that buffer switching is not necessary, and processing terminates.

On the other hand, when determining that the rendering component with the highest load is not rendering into the high-speed frame buffer 31 (S202: NO), the switching determination unit 81 commands the switching procedure selection unit 83 to select a switching procedure. The switching procedure selection unit 83 performs switching procedure selection processing (S203).

The switching procedure selection unit 83 selects the most appropriate procedure from among the first through the fourth switching procedures. The switching procedure selection unit 83 then stores the selected procedure in the information storage unit 17 as the switching procedure information 45 (S204).

The processing in S204 is performed in accordance with the flowchart described with reference to FIG. 10.

The switching determination unit 81 acquires the switching procedure information 45 from the information storage unit 17 (S205).

The switching determination unit 81 then compares the switching cost for the procedure selected by the switching procedure selection unit 83 with a stored threshold. If the switching cost is equal to or greater than the threshold, the switching determination unit 81 determines not to perform switching (S206: NO). Processing then terminates. On the other hand, if the switching cost is less than the threshold, the switching determination unit 81 determines to perform switching (S206: YES) and issues a request to perform switching to the switching performance unit 82.

Next, the switching performance unit 82 reads the execution state of rendering processing by the first execution management unit 72 and the second execution management unit 74. After rendering by both rendering components (61, 62) is complete, the switching performance unit 82 commands the first execution management unit 72 and the second execution management unit 74 to suspend rendering by the rendering components (61, 62) (S207). Note that when all of the rendering components (61, 62) are not currently rendering, the switching performance unit 82 immediately issues the suspend command.

Next, the switching performance unit 82 instructs the rendering copy control unit 22 to copy between the frame buffers in accordance with the acquired switching procedure (S208). Specifically, when the switching procedure indicated by the acquired switching procedure information 45 is the second switching procedure, the switching performance unit 82 instructs the rendering copy control unit 22 to copy the content of the buffer used by the first rendering component 61 into the buffer used by the second rendering component 62.

When the switching procedure indicated by the acquired switching procedure information 45 is the third switching procedure, the switching performance unit 82 instructs the rendering copy control unit 22 to copy the content of the buffer used by the second rendering component 62 into the buffer used by the first rendering component 61.

Next, the switching performance unit 82 acquires the addresses of the high-speed frame buffer 31 and the universal frame buffer 32 (high-speed frame buffer beginning address 91, universal frame buffer beginning address 92) from the frame buffer generation management unit 94. The switching performance unit 82 stores the address of the high-speed frame buffer 31 in the information storage unit 17 corresponding to the rendering component (61 or 62) determined in step S202 by the switching determination unit 81 to have the higher load for rendering. Furthermore, the switching performance unit 82 stores the address of the universal frame buffer 32 in the frame buffer information storage unit (124 or 125) corresponding to the rendering component (131 or 132) determined to have the lower load for rendering (S209). In this way, the rendering component determined to have the higher load for rendering is assigned the high-speed frame buffer (the high-speed frame buffer 31) and uses the high-speed frame buffer for the next rendering.

Next, the switching performance unit 82 notifies the combination management unit 14 and changes the setting for overlap when combining the high-speed frame buffer 31 and the universal frame buffer 32 (S210).

In accordance with the switching procedure, the switching performance unit 82 then locks the display screen if necessary (S211).

Specifically, the switching performance unit 82 instructs the combination management unit 14 to lock the screen. The combination management unit 14 then suspends frame buffer combination that could cause display failure.

In this context, display failure refers to a screen being shown on the display 35 while the screen is still incomplete due to rendering by the rendering components (61, 62) having not yet concluded.

Next, the switching performance unit 82 commands the first execution management unit 72 and the second execution management unit 74 to recommence rendering that was suspended in S207 (S213).

Finally, if the screen has been locked in S212, the switching performance unit 82 unlocks the screen at an appropriate time in accordance with information stored in the information storage unit 17 (S214). Specifically, the switching performance unit 82 instructs the combination management unit 14 to unlock the screen. The combination management unit 14 then recommences combination of the high-speed frame buffer 31 and the universal frame buffer 32.

In this way, in the information processing terminal 1, after rendering that was suspended recommences, the rendering component that was determined in step S202 by the switching determination unit 81 to have the higher load for rendering performs rendering using the high-speed frame buffer. Switching also allows for prevention of display failure or flickering on the screen.

3. Modifications

While the present invention has been described based on the above embodiments, the present invention is in no way limited to the above embodiments. It is of course possible to apply a variety of modifications without departing from the scope of the present invention.

(1) In Embodiment 1, the CPU load is defined as (time necessary for rendering)/(rendering interval), but the CPU load is not limited in this way. For example, the CPU load may be the average of a plurality of CPU loads calculated from the previous switching determination by the switching determination unit 81 until the present.

(2) In the above embodiments, the information processing terminal 1 is a portable information terminal, but the information processing terminal 1 is not limited in this way. The information processing terminal 1 may be a stationary information terminal, a cellular telephone, a piece of AV equipment, or the like.

The application executed by the information processing terminal 1 has been described as rendering a map or a photograph, but the application is not limited in this way. The application may perform a combination of rendering of a map, video, photograph, CG (Computer Graphics), text, or the like.

In the above embodiments, an example is described in which one application includes two rendering components, but the present invention is not limited in this way and may be applied to the case of parallel execution of a plurality of rendering processes. For example, the present inventory may be applied to parallel execution of two applications, such as an application that displays a map and an application that displays a photograph.

(3) In Embodiment 1, only two components are used, but three or more components may be used. The X Window System™ may be installed in the software section of the information processing terminal 1 (not shown in the figures). Rendering may be performed into the universal frame buffer 32 via the X Window System™. In this case, if rendering is performed into the high-speed frame buffer 31 without traversing the X Window System™, rendering that uses the high-speed frame buffer 31 becomes even faster when compared to rendering that uses the universal frame buffer 32. Furthermore, since only a single component designated by the switching determination unit 81 is permitted to write data into the high-speed frame buffer 31, the designated component can execute rendering faster than other components.

On the other hand, two or more components can simultaneously request to write data into the universal frame buffer 32. The X Window System™ arbitrates these write requests and writes, into the universal frame buffer 32, the data requested by the components to be written. Accordingly, the difference between the time necessary for rendering using the universal frame buffer 32 and the time necessary for rendering using the high-speed frame buffer 31 is greater than when not using the X Window System™.

(4) The above devices are, specifically, a computer system composed of a microprocessor, ROM, RAM, hard disk unit, display unit, keyboard, mouse, etc. The RAM or the hard disk unit stores computer programs. The microprocessor operates according to the computer programs, and thereby the devices accomplish their functions. In order to achieve predetermined functions, the computer programs are composed of a combination of multiple command codes that indicate instructions for the computer.

The devices are not limited to a computer system that includes all of the following components: microprocessor, ROM, RAM, hard disk unit, display unit, keyboard, mouse, and the like; the devices may also be a computer system composed of only some of these components.

(5) Some or all of the constituent elements in the above devices may be composed of circuits for achieving the functions of the constituent elements, of programs for achieving the functions of the constituent elements along with a processor that runs the programs, or of one system Large Scale Integration (LSI). A system LSI is an ultra-multifunctional LSI produced by integrating multiple components on one chip and, more specifically, is a computer system including a microprocessor, ROM, RAM, and the like. Computer programs are stored in the RAM. The microprocessor operates in accordance with the computer programs, and thereby the system LSI accomplishes the functions thereof. Constituent elements may respectively be made into discrete chips, or part or all of the constituent elements may be made into one chip.

Although referred to here as a system LSI, depending on the degree of integration, the terms IC, system LSI, super LSI, or ultra LSI are also used.

In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(6) Part or all of the constituent elements comprising each of the above devices may be assembled as an IC card detachable from each device, or as a single module. The IC card/module is a computer system that includes a microprocessor, ROM, RAM, and the like. The IC card/module may include therein the above-mentioned ultra-multifunctional LSI. The microprocessor operates according to computer programs, and the IC card/module thereby accomplishes its functions. The IC card/module may be tamper resistant.

(7) The present invention may be the above-described methods. The present invention may be computer programs that achieve the methods by a computer or may be a digital signal comprising the computer programs.

The present invention may also be a computer-readable recording medium, such as a flexible disk, hard disk, CD-ROM, MO, DVD, DVD-ROM, DVD-RAM, Blu-ray Disc (BD), or semiconductor memory, on which the above-mentioned computer program or digital signal is recorded. The present invention may also be the computer programs or digital signal recorded on such a recording medium.

The present invention may also be the computer programs or digital signal to be transmitted via networks, of which telecommunications networks, wire/wireless communications networks, and the Internet are representative, or via data broadcasting.

Also, another independent computer system may implement the computer programs or digital signal after the computer programs or digital signal are transferred via being recorded on the recording medium, via one of the above-mentioned networks, or the like.

(8) The above embodiments and modifications may be combined with one another.

INDUSTRIAL APPLICABILITY

The display switching apparatus according to the present invention is useful in an information processing terminal, AV equipment, communications terminal, and the like that have the function of displaying a plurality of windows in overlap.

REFERENCE SIGNS LIST 1 information processing terminal
11 frame buffer management unit
12 display switching apparatus
13 application unit
14 combination management unit
15 display unit
16 input unit
17 information storage unit
18 high-speed memory device
19 universal memory device
20 display memory device
21 display switching unit
22 rendering copy control unit
31 high-speed frame buffer
32 universal frame buffer
33 display frame buffer
61 first rendering component
62 second rendering component
63 processing control unit
81 switching determination unit
82 switching performance unit
83 switching procedure selection unit
84 display time calculation unit

The invention claimed is:

1. A display switching apparatus for switching a buffer apparatus allocated to each of a plurality of rendering components between a high-speed buffer apparatus and a universal buffer apparatus that are used for rendering images, the display switching apparatus comprising:
a switching determination unit operable to repeatedly calculate a rendering load for each of the plurality of rendering components; and
a switching performance unit operable to determine, each time the rendering load is calculated, whether the high-speed buffer apparatus is allocated to a highest-load rendering component, the highest-load rendering component having a highest calculated rendering load among the plurality of rendering components, and when determining negatively, to switch the buffer apparatus allocated to the highest-load rendering component and the high-speed buffer apparatus allocated to one of the plurality of rendering components, wherein
the high-speed buffer apparatus and the universal buffer apparatus are two different memory apparatuses, and the high-speed buffer apparatus performs data input-output at a higher speed than the universal buffer apparatus,
the switching performance unit selects one of a first, a second, and a third switching procedure, the first switching procedure being to switch the universal buffer apparatus and the high-speed buffer apparatus without copying content stored in either buffer apparatus, the second switching procedure being to switch the universal buffer apparatus and the high-speed buffer apparatus after copying content stored in the high-speed buffer apparatus into the universal buffer apparatus, and the third switching procedure being to switch the universal buffer apparatus and the high-speed buffer apparatus after copying content stored in the universal buffer apparatus into the high-speed buffer apparatus, and
the switching performance unit selects one of the switching procedures by calculating a buffer switching cost for each of the switching procedures, the buffer switching cost being a comparison of rendering to be performed after switching buffer apparatuses and rendering performed without switching buffer apparatuses, and selects a switching procedure having a smallest buffer switching cost.

2. The display switching apparatus of claim 1, wherein
the rendering load for each rendering component is a time spent performing rendering per unit time, and
the switching performance unit selects, as the highest-load rendering component, a rendering component with a longest time spent performing rendering per unit time.

3. The display switching apparatus of claim 1, wherein
the buffer switching cost is determined from at least one of a count of dropped frames, a display delay, and a CPU load.

4. The display switching apparatus of claim 1, wherein
the buffer switching cost is determined from at least two of a count of dropped frames, a display delay, and a CPU load.

5. The display switching apparatus of claim 1, wherein
when skipped processing is determined to occur during display of frame images on a screen, the switching performance unit locks the screen while the skipped processing is occurring.

6. A display switching method used in a display switching apparatus for switching a buffer apparatus allocated to each of a plurality of rendering components between a high-speed buffer apparatus and a universal buffer apparatus that are used for rendering images, the display switching method comprising the steps of:
repeatedly calculating a rendering load for each of the plurality of rendering components; and
determining, each time the rendering load is calculated, whether the high-speed buffer apparatus is allocated to a highest-load rendering component, the highest-load rendering component having a highest calculated load among the plurality of rendering components, and when determining negatively, switching the buffer apparatus allocated to the highest-load rendering component and the high-speed buffer apparatus allocated to one of the plurality of rendering components, wherein the high-speed buffer apparatus and the universal buffer apparatus are two different memory apparatuses, and the high-speed buffer apparatus performs data input-output at a higher speed than the universal buffer apparatus, said determining further comprises selecting one of a first, a second, and a third switching procedure, the first switching procedure being to switch the universal buffer apparatus and the high-speed buffer apparatus without copying content stored in either buffer apparatus, the second switching procedure being to switch the universal buffer apparatus and the high-speed buffer apparatus after copying content stored in the high-speed buffer apparatus into the universal buffer apparatus, and the third switching procedure being to switch the universal buffer apparatus and the high-speed buffer apparatus after copying content stored in the universal buffer apparatus into the high-speed buffer apparatus, and said determining further comprises selecting one of the switching procedures by calculating a buffer switching cost for each of the switching procedures, the buffer switching cost being a comparison of rendering to be performed after switching buffer apparatuses and rendering performed without switching buffer apparatuses, and selecting a switching procedure having a smallest buffer switching cost.

7. An integrated circuit for switching a buffer apparatus allocated to each of a plurality of rendering components between a high-speed buffer apparatus and a universal buffer apparatus that are used for rendering images, the integrated circuit comprising:

a switching determination unit operable to repeatedly calculate a rendering load for each of the plurality of rendering components; and a switching performance unit operable to determine, each time the rendering load is calculated, whether the high-speed buffer apparatus is allocated to a highest-load rendering component, the highest-load rendering component having a highest calculated rendering load among the plurality of rendering components, and when determining negatively, to switch the buffer apparatus allocated to the highest-load rendering component and the high-speed buffer apparatus allocated to one of the plurality of rendering components, wherein the high-speed buffer apparatus and the universal buffer apparatus are two different memory apparatuses, and the high-speed buffer apparatus performs data input-output at a higher speed than the universal buffer apparatus, the switching performance unit selects one of a first, a second, and a third switching procedure, the first switching procedure being to switch the universal buffer apparatus and the high-speed buffer apparatus without copying content stored in either buffer apparatus, the second switching procedure being to switch the universal buffer apparatus and the high-speed buffer apparatus after copying content stored in the high-speed buffer apparatus into the universal buffer apparatus, and the third switching procedure being to switch the universal buffer apparatus and the high-speed buffer apparatus after copying content stored in the universal buffer apparatus into the high-speed buffer apparatus, and the switching performance unit selects one of the switching procedures by calculating a buffer switching cost for each of the switching procedures, the buffer switching cost being a comparison of rendering to be performed after switching buffer apparatuses and rendering performed without switching buffer apparatuses, and selects a switching procedure having a smallest buffer switching cost.

* * * * *